(12) United States Patent
Botte

(10) Patent No.: US 8,758,951 B2
(45) Date of Patent: Jun. 24, 2014

(54) ELECTROCATALYSTS AND ADDITIVES FOR THE OXIDATION OF SOLID FUELS

(75) Inventor: Gerardine Botte, Athens, OH (US)

(73) Assignee: Ohio University, Athens, OH (US)

( * ) Notice: Subject to any disclaimer, the term of this patent is extended or adjusted under 35 U.S.C. 154(b) by 1995 days.

(21) Appl. No.: 11/913,753

(22) PCT Filed: May 8, 2006

(86) PCT No.: PCT/US2006/017641
§ 371 (c)(1), (2), (4) Date: Aug. 14, 2008

(87) PCT Pub. No.: WO2006/121981
PCT Pub. Date: Nov. 16, 2006

(65) Prior Publication Data
US 2009/0145750 A1    Jun. 11, 2009

Related U.S. Application Data

(60) Provisional application No. 60/678,725, filed on May 6, 2005.

(51) Int. Cl.
| | |
|---|---|
| H01M 8/06 | (2006.01) |
| H01M 4/92 | (2006.01) |
| C25B 1/02 | (2006.01) |
| C25B 11/02 | (2006.01) |
| C25B 11/04 | (2006.01) |
| H01M 8/08 | (2006.01) |

(52) U.S. Cl.
CPC ............. *H01M 8/0612* (2013.01); *H01M 4/92* (2013.01); *H01M 4/926* (2013.01); *C01B 2203/066* (2013.01); *C25B 1/02* (2013.01); *Y02E 60/36* (2013.01); *C25B 11/02* (2013.01); *C25B 11/0494* (2013.01); *H01M 8/08* (2013.01); *Y02E 60/50* (2013.01); *Y02E 60/528* (2013.01)
USPC ........... 429/425; 429/405; 429/411; 429/416; 429/417; 429/421; 429/424; 429/485; 429/487; 429/521; 429/524; 429/525; 429/526

(58) Field of Classification Search
CPC ...... C25B 11/02; C25B 11/0494; C25B 1/02; C01B 2203/066; H01M 8/0612; H01M 4/92; H01M 4/926; H01M 8/08; Y02E 60/36; Y02E 60/50; Y02E 60/528
USPC ......... 429/405, 411, 416, 417, 421, 424, 425, 429/482, 485, 487, 521, 522, 524, 525, 526
See application file for complete search history.

(56) References Cited

U.S. PATENT DOCUMENTS

| | | | |
|---|---|---|---|
| 3,650,838 A | 3/1972 | Giner et al. | |
| 4,141,801 A * | 2/1979 | Perry | 205/171 |
| 4,226,683 A | 10/1980 | Vaseen | |
| 4,388,162 A | 6/1983 | Sammells et al. | |
| 4,430,175 A * | 2/1984 | Kreysa et al. | 205/342 |
| 4,453,594 A | 6/1984 | Patton et al. | |
| 4,541,989 A * | 9/1985 | Foller | 422/186.07 |
| 4,608,137 A * | 8/1986 | Vaughan et al. | 205/637 |
| 4,643,809 A | 2/1987 | Botts et al. | |
| 4,752,364 A * | 6/1988 | Dhooge | 205/688 |
| 6,531,050 B1 | 3/2003 | Waite | |
| 6,627,035 B2 | 9/2003 | Fan et al. | |
| 6,764,589 B1 | 7/2004 | Puetter | |
| 6,972,160 B2 | 12/2005 | Okada et al. | |
| 7,098,163 B2 | 8/2006 | Hampden-Smith et al. | |
| 7,144,476 B2 | 12/2006 | Wilde et al. | |
| 2002/0037446 A1 | 3/2002 | Iyer | |
| 2002/0132154 A1 | 9/2002 | Adzic et al. | |
| 2003/0026982 A1 | 2/2003 | Yanagisawa et al. | 428/364 |
| 2003/0070910 A1 | 4/2003 | Otsuka et al. | |
| 2004/0018414 A1* | 1/2004 | Adzic et al. | 429/40 |
| 2004/0101471 A1* | 5/2004 | Petch et al. | 423/650 |
| 2004/0151896 A1 | 8/2004 | Houda et al. | |
| 2005/0112450 A1* | 5/2005 | Wang et al. | 429/44 |
| 2005/0232857 A1* | 10/2005 | Lomax et al. | 423/652 |
| 2005/0260120 A1* | 11/2005 | Smalley et al. | 423/447.1 |
| 2006/0234039 A1 | 10/2006 | Bose et al. | |
| 2006/0269824 A1 | 11/2006 | Hampden-Smith et al. | |
| 2006/0292434 A1 | 12/2006 | Hampden-Smith et al. | |
| 2007/0077491 A1 | 4/2007 | Burchardt | |

1.—WORKING ELECTRODE
2.—COUNTER ELECTRODE
3.—ELECTROLYTE
4.—ROTATOR
5.—HEATING MANTLE
6.—TEMPERATURE CONTROLLER
7.—POTENTIOSTAT
8.—DATA RECORDER

FOREIGN PATENT DOCUMENTS

| CA | 1244873 | | 11/1988 |
|---|---|---|---|
| CA | 2353761 | A1 | 1/2002 |
| EP | 1 408 569 | A2 | 4/2004 |
| WO | 02/44081 | A1 | 6/2002 |
| WO | WO 02/44081 | A1 | 6/2002 |
| WO | 2005038967 | A1 | 4/2005 |
| WO | WO 2005/035444 | A2 | 4/2005 |

OTHER PUBLICATIONS

International Search Report and Written Opinion in Application No. PCT/US04/33552, dated Jan. 19, 2006.
International Preliminary Report on Patentability in Application No. PCT/US04/33552, dated Apr. 20, 2006.
International Search Report and Written Opinion in Application No. PCT/US06/40468, dated Apr. 29, 2008.
International Search Report and Written Opinion in Application No. PCT/US06/17641, dated Jul. 16, 2008.
Office Action in U.S. Appl. No. 10/962,894, dated Dec. 13, 2006.
Jun. 13, 2007 Response to Office Action in U.S. Appl. No. 10/962,894, dated Dec. 13, 2006.
Office Action in U.S. Appl. No. 10/962,894, dated Aug. 16, 2007.
Feb. 19, 2008 Response to Office Action in U.S. Appl. No. 10/962,894, dated Aug. 16, 2007.
Office Action in U.S. Appl. No. 10/962,894, dated Mar. 20, 2008.
Aug. 14, 2008 Response to Office Action in U.S. Appl. No. 10/962,894, dated Mar. 20, 2008.
Notice of Allowance in U.S. Appl. No. 10/962,894, dated Oct. 8, 2008.
Andonoglou et al., "Preparation and electrocatalytic activity of rhodium modified pitch-based carbon fiber electrodes," Electrochimica Acta (1998) vol. 44, pp. 1455-1465.
Baldwin et al., "Voltammetry and electrolysis of coal slurries and H-coal liquids," Fuel (1981) vol. 60, pp. 739-743.
Bergamaski et al., "Effect of alcohol concentration and electrode composition on the ethanol electrochemical oxidation," Eclética Química (2003) vol. 28, Issue 2, pp. 87-92.
Bonnin et al., "Feasibility of electrolyzing ammonia effluents for the production of hydrogen," 206th Electrochemical Society Conference Meeting, Oct. 3-8, 2004, Hawaii. Powerpoint Presentation.
Botte, "Ammonia electrolysis to power a hydrogen fuel cell: case study of an integrated system and economics," 206th Electrochemical Society Conference Meeting, Oct. 3-8, 2004, Hawaii. Powerpoint Presentation.
Botte et al., "Electrolysis of Ohio coal for the production of hydrogen for fuel cell applications"—Annual Project Report as of Sep. 2004.
Botte et al., "Electrolysis of Ohio coal for the production of hydrogen for fuel cell applications"—abstract submitted to Ohio University for subcontract OCRC3-04 D-4.1—Reporting Period—Annual Report (year 1—Sep. 2004).
Botte et al., "Electrolysis of Ohio coal for the production of hydrogen for fuel cell applications"—abstract submitted to Ohio University for subcontract OCRC3-04 D-4.11—quarterly report (year 1)—Reporting Period Sep. 1, 2003-Dec. 1, 2003.
Botte et al., "Electrolysis of Ohio coal for the production of hydrogen for fuel cell applications"—abstract submitted to Ohio University for subcontract OCRC3-04 D-4.11—quarterly report (year 1) Reporting Period: Dec. 1, 2003-Feb. 29, 2004.
Botte et al., "Electrolysis of Ohio coal for the production of hydrogen for fuel cell applications"—abstract submitted to Ohio University for subcontract OCRC3-04 D-4.1—quarterly report (year 1) Reporting Period: Mar. 1, 2004-May 30, 2004.
Botte et al., "Electrolysis of Ohio coal for the production of hydrogen for fuel cell applications"—abstract submitted to Ohio University for subcontract OCRC3-04 D-4.1—quarterly report (year 1) Reporting Period: Jun. 1, 2004-Sep. 1, 2004.
Botte et al., "Electrolysis of Ohio coal for the production of hydrogen for fuel cell applications"—abstract submitted to Ohio University for subcontract OCRC3-04 D-4.11—quarterly report (year 2) Reporting Period: Sep. 1, 2004-Dec. 1, 2004.
Botte et al., "Electrolysis of Ohio coal for the production of hydrogen for fuel cell applications"—abstract submitted to Ohio University for subcontract OCRC3-04 D-4.11—quarterly report (year 2) Reporting Period: Dec. 1, 2004-Feb. 28, 2005.
Botte et al., "Electrolysis of Ohio coal for the production of hydrogen for fuel cell applications,"—Ohio Coal Development Office, Ohio Air Quality Meeting, Dec. 2, 2004. Powerpoint Presentation.
Botte et al., "Electrolysis of Ohio coal for the production of hydrogen for fuel cell applications," 30th International Technical Conference on Coal Utilization & Fuel Systems, Apr. 17-21, 2005, Clearwater, Florida. Power Point Presentation.
Botte, Electrochemical coal gasification with novel electrodes—submitted to the Edison Materials Technology Center (EMTEC) in response to Hydrogen Program Solicitation Round 2 dated Jan. 12, 2005.
EMTEC Hydrogen Program 2005 RFP Round 2—Phase 1 Proposal Application Forms—Botte, Gerardine G., Electrochemical coal gasification with novel electrodes dated Jan. 12, 2005.
Cairns et al., "Ammonia-oxygen fuel cell," Nature (1968) vol. 217, pp. 780-781.
Carrette et al., "Fuel Cells—Fundamentals and Applications," Fuel Cells (2001) vol. 1, pp. 5-39.
Choudhary et al., "CO-free fuel processing for fuel cell applications," Catalysis Today (2002) vol. 77(1-2), pp. 65-78.
Cooper et al., "Electrocatalysis of the oxidation of ammonia by Raney nickel and platinum," 206th Electrochemical Society Conference Meeting, Oct. 3-8, 2004, Hawaii. Poster Presentation.
De et al., "Kinetic studies of the electrochemical treatment of nitrate and nitrite ions on iridium-modified carbon fiber," Chem. Eng. Technol. (2004) vol. 27, No. 1, pp. 56-64.
De Abreu et al., "Experimental and theoretical investigation of the electrolysis of ethanol for fuel cell applications," 206th Electrochemical Society Conference Meeting, Oct. 3-8, 2004, Hawaii. Powerpoint Presentation.
Georgolios et al., "Pt electrodeposition on PAN-based carbon fibres," J. Electroanal. Chemistry (1989) vol. 264, pp. 235-245.
Gonzalez et al., "Electro-oxidation of ammonia on carbon fibers," unnumbered abstract from 206th Electrochemical Society Conference Meeting, Oct. 3-8, 2004, Hawaii. (first publicly available Jul. 15, 2004).
Gonzalez et al, "Electro-oxidation of ammonia on carbon fibers," 206th Electrochemical Society Conference Meeting, Oct. 3-8, 2004, Hawaii. Powerpoint Presentation.
Kawase et al., "Effects of NH3 and NOx on the Performance of MCFCs," J. Power Sources, (2002) vol. 104, pp. 265-271.
Lamy-Pitara et al., "Platinum modified by electrochemical deposition of adatoms," Appl. Catal. (Jan. 23, 1997), vol. 149, Issue 1, pp. 49-87.
Liu et al., "Array membrane electrode assemblies for high throughput screening of DMFC anode catalysts," J. Electroanalytical Chem. (2002) vol. 535, pp. 49-55.
Marquez et al., "Theoretical investigation of the solid oxide fuel cell anode," 206th Electrochemical Society Conference Meeting, Oct. 3-8, 2004, Hawaii. Powerpoint Presentation.
McKee et al., "Improved Electrocatalysts for Ammonia Fuel Cell Anodes," J. Electrochem. Soc. (1969) vol. 116, pp. 562-568.
Marrese, "Preparation of strongly adherent platinum black coatings," Anal. Chem. (1987) vol. 59, pp. 217-218.
Miles et al., "The oxygen evolution reaction on platinum, iridium, ruthenium and their alloys at 80° C in acid solutions," Electrochemica Acta (1978) vol. 23, pp. 521-526.
Nart et al., "Reactivity of ethanol on platinum and platinum-rhodium bimetallic electrodes," COLL 124, Electrochemistry and Surface Science Symposium in Memory of Mike Weaver, Division of Colloid and Surface Chemistry, The 225th ACS National Meeting, New Orleans, LA, Mar. 23-27, 2003.
Patil et al., "Evaluation of different electrode materials for the electro-oxidation of coal slurries for hydrogen production," 205th Electrochemical Society Conference Meeting, San Antonio, Texas, May 9-13, 2004. Poster Presentation.
Patil et al., "Evaluation of different electrode materials for the electro-oxidation of coal slurries for hydrogen production" , Abs.

682, 205th Electrochemical Society Conference Meeting, May 9-13, 2004. (first publicly available Feb. 12, 2004).
Patil et al., "Investigation of electrode kinetics for the electro-oxidation of coal slurries," 206th Electrochemical Society Conference Meeting, Hawaii Oct. 3-8, 2004. Poster Presentation.
Patil et al., "Investigation of electrode kinetics for the electro-oxidation of coal slurries" Abs. 565, 206th Electrochemical Society Conference Meeting, Hawaii Oct. 3-8, 2004. (first publicly available Jul. 15, 2004).
Reddington et al., "Combinatorial discovery of and optimization of new electrocatalysts," Combinatorial Chemistry: A Practical Approach (2000), H. Fenniri, Ed., Oxford University Press, Oxford, UK, pp. 401-420.
European Examination Report issued in Application No. 06 759 267.5-2119, dated May 17, 2011.
Coughlin, R. W. & Farooque, M., Consideration of electrodes and electrolytes for electrochemical gasification of coal by anodic oxidation, Journal of Applied Electrochemistry, vol. 10, 1980, pp. 729-740, XP-002546896.
Sathe, N. et al., Assessment of Coal and Graphite Electrolysis, Abstract, 206th meeting, the Electrochemical Society, Inc., 2004, retrieved from the Internet: URL:www.electrochem.org/dl/ma/206/pdfs/0559.pdf, XP002546948.
Supplementary European Search Report, EP 06 75 9267, Completed Sep. 23, 2009, mailed Oct. 2, 2009.
Sathe et al., "Assessment of coal and graphite electrolysis" Abs. 559, 206th Electrochemical Society Conference Meeting, Oct. 3-8, 2004, Hawaii. (first publicly available Jul. 15, 2004).
Sathe et al., "Assessment of coal and graphite electrolysis," 206th Electrochemical Society Conference Meeting, Oct. 3-8, 2004, Hawaii. Poster Presentation.
Vitse et al., "Ti supported polymetallic catalysts for ammonia oxidation in alkaline media," 205th Electrochemical Society Conference Meeting, May 9-13, 2004, San Antonio, Texas. Powerpoint Presentation.
Vitse et al., "Polymetallic electrocatalysts on titanium substrate for the oxidation of dissolved ammonia," Abs. 679, 205th Electrochemical Society Conference Meeting, May 9-13, 2004, San Antonio, Texas. (first publicly available Feb. 12, 2004).
Vitse et al., "On the use of ammonia electrolysis for hydrogen production," Journal of Power Sources (2005) vol. 142, pp. 18-26.
Official Action regarding Canadian Patent Application Serial No. 2,614,591, mailed Feb. 17, 2012.

* cited by examiner

*Primary Examiner* — Patrick Ryan
*Assistant Examiner* — Ben Lewis
(74) *Attorney, Agent, or Firm* — Wood, Herron & Evans, LLP

(57) ABSTRACT

A continuous coal electrolytic cell for the production of pure hydrogen without the need of separated purification units Electrodes comprising electrocatalysts comprising noble metals electrodeposited on carbon substrates are also provided. Also provided are methods of using the electrocatalysts provided herein for the electrolysis of coal in acidic medium, as well as electrolytic cells for the production of hydrogen from coal slurries in acidic media employing the electrodes described herein. Further provided are catalytic additives for the electro-oxidation of coal. Additionally provided is an electrochemical treatment process where iron-contaminated effluents are purified in the presence of coal slurries using the developed catalyst.

14 Claims, 10 Drawing Sheets

1.—WORKING ELECTRODE
2.—COUNTER ELECTRODE
3.—ELECTROLYTE
4.—ROTATOR
5.—HEATING MANTLE
6.—TEMPERATURE CONTROLLER
7.—POTENTIOSTAT
8.—DATA RECORDER

ELECTROCATALYSTS AND ADDITIVES FOR THE OXIDATION OF SOLID FUELS

CROSS-REFERENCE TO RELATED APPLICATIONS

This application claims priority to U.S. Provisional Patent Application Ser. No. 60/678,725; filed May 6, 2005, entitled, ELECTROCATALYSTS AND ADDITIVES FOR THE OXIDATION OF SOLID FUELS, the entirety of which is incorporated herein by reference.

BACKGROUND OF THE INVENTION

Hydrogen is expected to be a primary energy source in the 21st century for electricity generation, fuel and other applications. It is an environmentally clean energy source since it generates no pollutants. Fossil fuels and water are the major sources for the manufacture of hydrogen. However, these processes are highly energy intensive consuming nearly twice as much as energy from these sources and not always environment-friendly. Moreover, the fossil-fuel (mainly petroleum) reserves of the world are depleting at an alarming rate. The electrolysis of water so far is the cleanest way but the theoretical over-potential required to oxidize water is −1.23 V versus SHE (standard hydrogen electrode).

Coal which is considered as the cheapest source of energy available on earth, can be a potential solution to confront the issues associated with the electrolysis of water, we propose to demonstrate and study the feasibility of continuously electrolyzing Ohio coal to produce hydrogen for fuel cell applications. The reversible thermodynamic potential of the oxidation of coal is only −0.21 V which is much less when compared to conventional water electrolysis, thus making coal slurry electrolysis more competitive.

Coughlin and Farooque reported the equations (3)-(5).[1-3] The authors found that the current efficiency for the production of hydrogen was 100%. These researchers reported that coal slurry needs to strike the electrode, which means that the reaction involves the solid and not only the liquid.[1-3]

Other researchers performed additional studies to have a better understanding of the electro-oxidation. Baldwin et al.[4] analyzed the fundamental electrochemical behavior of coal slurries using voltammetry techniques. Different slurry samples were prepared with bituminous Kentucky coals (Kentucky Institute for Mining and Minerals Research): No. 9 Seam, No. 11 Seam, Sterns No. 2 Seam, Elkhorn No. 3 Seam, and one anthracite coal sample (ICH-13) from the Buck Mountain seam from Zerbe, Pa. The electrochemical cell (batch cell) consisted of a three electrode arrangement, with Pt gauze as the working and counter electrodes and SCE as the reference electrode. The electrolyte solution for the cathode compartment was $H_2SO_4$, and $LiClO_4$ was used for the anode compartment. The authors do not present an explanation of why they used $LiClO_4$. The solutions were deoxygenated with $N_2$ prior to use. All of the slurries were 2% weight concentration. The authors[4] found much lower currents than the ones reported by Coughlin and Farooque[1-3] (10 times lower) and they attributed this behavior to the types of coal utilized, coal slurry concentration, electrode area, and reaction temperature employed. However, the electrolyte that they used is different and this may have affected their results. An important finding by the authors is that they reported that the activity of the system is in the extracted solution and not in the slurry. This finding is in some sense contradictory with what Coughlin and Farooque observed.[1-3] These researchers reported that coal slurry needs to strike the platinum electrode, which means that the reaction involves the solid and not only the liquid.[1-3]

Dhooge et al.[5] tried to elucidate the mechanisms associated with the electrolysis of coal. For their experiments, the authors used a coal sample from the San Juan Valley, northwestern New Mexico (44.81% C, 3.91% H, 0.47% N, and about 33% ash content). The most important finding of this paper[5] is that they proposed a mechanism for the electro-oxidation of coal that seems to be in agreement with the observations reported by Coughlin and Farooque.[1-3] According to the authors $Fe^{+3}$ acts as a catalyst, which is oxidized to $Fe^{+2}$ on the coal according to the chemical reaction:[5]

$$4Fe^{+3} + C + 2H_2O \rightarrow 4Fe^{+2} + CO_2 + 4H^+ \quad (1)$$
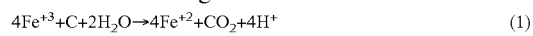

The reduction of $Fe^{+3}$ to $Fe^{+2}$ is spontaneous, but it needs to happen at a surface, in this case the surface is the coal (which is oxidized). This means that the slurry needs to be present. On the other hand, $Fe^{+3}$ is regenerated at the anode electrode according to the reaction:

$$Fe^{+2} \rightarrow Fe^{+3} + e^- \quad (2)$$

If only the filtrate is used, $Fe^{+2}$ would not be regenerated. This explains why Coughlin and Farooque could run their experiments for a long time without a decrease in the current.[1-3] One point that the authors of this paper do not analyze is the statement made by Coughlin and Farooque that the slurry (including the solids) needs to be in contact with the working electrode.[1-3] Our explanation for this is that this is probably due to the fact that the concentration of $Fe^{+3}$ species (regenerated at the working electrode) is higher next to the electrode. Another important finding from Dhooge et al.[5] is the catalytic effect of $Ce^{+4}$.

However, none of the authors[1-10] were able to develop catalysts that enhance the oxidation of coal and they didn't combine the catalytic effect of $Fe^{+3}/Fe^{+2}$ for the production of hydrogen which is disclosed in this invention. Furthermore, they were not able to build a continuous cell for the electrolysis of coal. For example, the studies available in the open literature reported only small current densities (maximum of 8 mA/cm$^2$ calculated using geometric area of electrode) achieved at voltages of up to 1.0 V and operating temperatures of 80° C.[1-10].

SUMMARY OF THE INVENTION

Provided are electrodes comprising electrocatalysts comprising noble metals electrodeposited on carbon substrates. The carbon substrates may comprise many different carbon materials, including but not limited to carbon nano-tubes, carbon fibers, and so forth. Also provided are methods of using the electrocatalysts provided herein for the electrolysis of coal in acidic medium.

Also provided herein are electrolytic cells for the production of hydrogen from coal slurries in acidic media. In some embodiments, the electrolytic cells uses the electrodes described herein as the anode. In other embodiments, the electrolytic cells uses the electrodes described herein as the cathode. In still other embodiments, the electrolytic cells utilizes the electrodes provided herein as both the anode and the cathode. Also provided are coal/petroleum fuel cells and coke/char slurry fuel that utilize the electrocatalysts provided herein as the anode. Also provided are electrochemical treatment processes where iron-contaminated effluents are purified in the presence of coal slurries using the electrocatalysts described herein.

Further provided are catalytic additives for the electro-oxidation of coal, the catalytic additives comprising iron salts, i.e., $Fe^{+2}$ and $Fe^{+3}$. Provided also is an electrolytic cell for the production of hydrogen from coal slurries containing iron salts in acidic media using the developed catalyst as anode or cathode. Also provided are coal/petroleum fuel cells and coke/char slurry fuels cells containing iron salts fuel cell using the developed catalyst as anode. Also provided is an electrochemical treatment process where iron-contaminated effluents are purified in the presence of coal slurries using the developed catalyst.

DETAILED DESCRIPTION OF THE INVENTION

Figure 1:
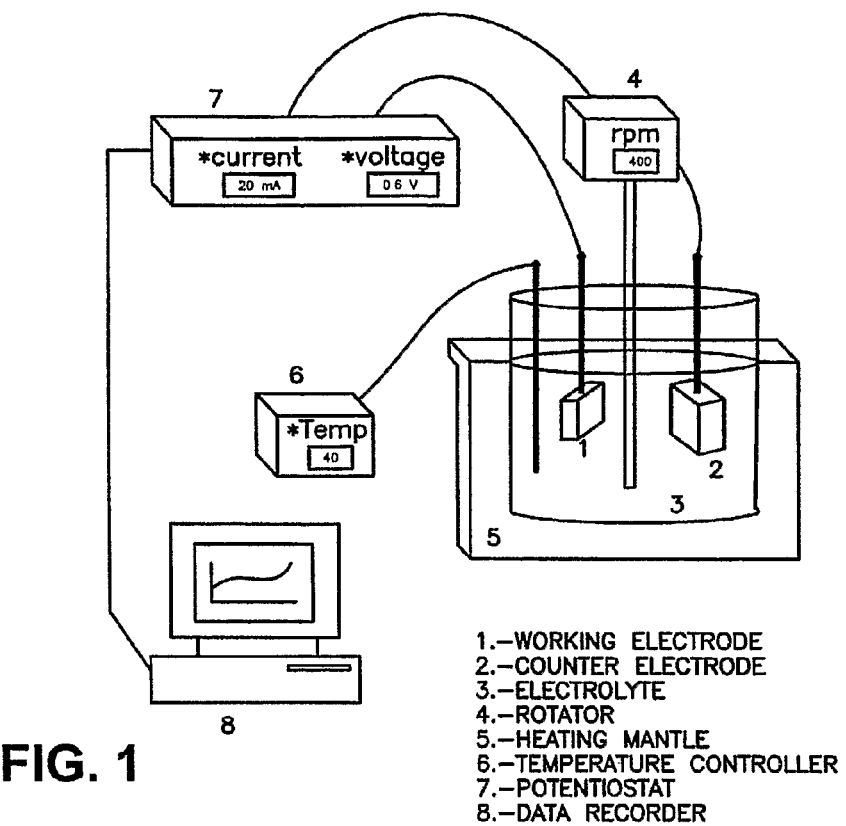
FIG. 1 is a schematic representation of the Glass cell for electro-oxidation studies of Ohio coal.

An electrocatalyst made of electrodeposited noble metals (by layers) on supported carbon fibers (nano-tubes or carbon fibers) has been developed for electrolysis of coal in acidic medium. Described herein are: an electrolytic cell for the production of hydrogen from coal slurries in acidic media using the developed catalyst as anode or cathode; coal/petroleum coke/char slurry fuel cell using the developed catalyst as anode; and an electrochemical treatment process where iron-contaminated effluents are purified in the presence of coal slurries using the developed catalyst.

Additives:

The catalytic effect of iron salts ($Fe^{+2}$ and $Fe^{+3}$) on the electro-oxidation of coal is also described herein. Further described herein are: an electrolytic cell for the production of hydrogen from coal slurries containing iron salts in acidic media using the developed catalyst as anode or cathode; coal/petroleum coke/char slurry containing iron salts fuel cell using the developed catalyst as anode; an electrochemical treatment process where iron-contaminated effluents are purified in the presence of coal slurries using the developed catalyst.

Continuous Coal Electrolytic Cell:

Problems associated with hydrogen sources and storage, and limitations in fuel flexibility are delaying the commercialization of fuel cells as a competitive technology for both transportation and stationary applications. Furthermore, current hydrogen production costs make fuel cell technology for power generation economically non-competitive when compared to traditional oil generation power systems. Current technologies are able to produce hydrogen at costs of between $5 to $6 per kg of $H_2$, due to separation costs, high temperature and high pressure operating conditions. To address these concerns, this we disclose the production of hydrogen by using a continuous coal electrolytic cell.

The electrochemical gasification of the carbon in coal takes place according to the following reactions:[1-3]

$$C + 2H_2O \rightarrow CO_2 + 4H^+ + e^- \qquad (3)$$

$$4H^+ + 4e^- \rightarrow 2H_2 \qquad (4)$$

where reactions (3) and (4) take place at the anode and cathode, respectively. The overall cell reaction is given by

$$C + 2H_2O \rightarrow CO_2 + 2H_2 \qquad (5)$$

The electrolysis of coal/water slurries has the potential to decrease the cost of hydrogen for distributed power. The theoretical voltage for the production of hydrogen at 25° C. through electrolysis of coal slurries in acidic media is 0.21 V, with an energy consumption of 5.6 W-h per g of $H_2$ produced (83% energy reduction compared to water electrolysis, which requires 1.23 V). If solar energy is used to supply the power (at a cost of $0.21/kWh), and the coal cost is set at $46 per ton, the theoretical cost of hydrogen produced by the electrolysis of coal slurries is estimated at $1.2 per kg of $H_2$ produced. This calculation indicates that the material and energy costs for electrolysis of coal slurries have the potential to decrease the overall costs for distributed hydrogen production when compared to current technologies ($5-$6 per kg of $H_2$).

As seen in Eq. (5), the electrochemical gasification of coal produces hydrogen directly from coal without $NO_x$, $SO_x$ pollution, or subsequent downstream gas separation or purification. The immediate anticipated benefits of the technology are: 1. Production of hydrogen at lower cost than the current technology (natural gas reforming) for distributed power, 2. Fuel flexibility, 3. Enhancement of the national security in the United States through less reliance on foreign fuel, and 4. Zero hazardous environmental emissions. In addition, the storage of coal/water slurries is commercially feasible; therefore, the electrolysis of coal/water slurries helps solve the problem of hydrogen storage.

Summarizing, provided herein is a continuous coal electrolytic cell for the production of pure hydrogen without the need of separated purification units. The cell can be integrated into a power generation system comprised by coal electrolytic cell/proton exchange membrane fuel cell.

Fuels:

The electrolytic cell, additives, and electrocatalysts can use solid fuels such as: petroleum coke, all ranges of coal, and chars.

The major breakthrough of systems described herein is that the oxidation of coal is significantly enhanced. The efficiency of our system (including coal electrolytic cell, novel electrodes, and use of additives) is 98% and 39.5% for the production of $H_2$ and $CO_2$, respectively. These results are encouraging and demonstrate that the electro-oxidation of a bituminous coal is possible (the highest efficiency reported in the literature[1-10] for the production of $CO_2$ is 30% for a lighter coal, North Dakota Lignite, at more intense conditions: 120° C., and 4M $H_2SO_4$). The energy consumption for the electrolysis of coal at 60° C. is 22.5 W-h/g $H_2$, while for water electrolysis at the same operating conditions in our cell is 42 W-h/g $H_2$ (46.5% lower energy consumption for the electrolysis of coal). These results indicate that the chemical energy of the coal is being used to minimize the energy consumption. Furthermore, the energy consumption of the cell can be decreased by determining the optimum operating conditions.

As described above, the electrolysis of coal was first investigated in the 1980s. These early studies concluded that the technology was not economically feasible for the production of hydrogen due to the low current densities achieved in the reaction (about 1 $mA/cm^2$ at 1 V). As a result, there was no further intensive study in the next two decades.

Recently, we have made significant progress enhancing the rate of reaction for the electro-oxidation of coal to values that can be used for the commercialization of different technologies (described previously): 1. An electrolytic cell for the production of hydrogen from coal slurries in acidic media using the developed catalyst as anode or cathode, 2. Coal slurry fuel cell using the developed catalyst as anode, and 3. An electrochemical treatment process where iron-contaminated effluents are purified in the presence of coal slurries using the developed catalyst.

The achievements are possible due to the following developments that are disclosed herein: 1. Development of better catalysts for the electro-oxidation of coal in acidic medium, 2. Enhancement of the electro-oxidation rate due to the presence of additives ($Fe^{+2}/Fe^{+3}$ salts), and 3. Development of continuous planar coal electrolytic cell.

Development of Better Catalysts for the Electro-Oxidation of Solid Fuel Slurries Such as: Petroleum Coke, all Ranges of Coal, and Chars in Acidic Medium (Example Shown for Bituminous Coal Slurries):

Different noble metals were tested for the electro-oxidation of Pittsburgh No. 8. The different electrode material foils (Pt, Pt—Ru, Pt—Ir, Pt—Rh) obtained from Alfa Aesar were cut into a rectangular shape of known area. The composition of the electrodes tested is given in Table 1. The cut foils were soldered to a copper wire of suitable length on to the center of one of the edges of the rectangular foil. The soldered part and most of the length of the copper wire was coated with a polymer (PTFE) which is stable at higher temperatures (120° C.) and resistant to the coal-water slurry in which it was tested. This coating was done twice and heated for 15-20 minutes in an oven at 200° C. to ensure uniform distribution of the coating and finally air dried. Pt, Pt—Ir, Pt—Ru, Pt—Rh obtained form Alfa Aesar were used for the evaluation. Before the electrodes were used for testing they were cleaned properly with a strong base and with acetone to remove any dust particles (as well as grease) on the surface and finally with distilled water.

TABLE 1

Composition of the Electrodes

| Electrodes | Major Metal (Wt %) | Minor Metal (Wt %) |
| --- | --- | --- |
| Pt | 99.9 (Pt) | — |
| Pt—Ir | 80.0 (Pt) | 20.0 (Ir) |
| Pt—Ru | 95.2 (Pt) | 4.8 (Ru) |
| Pt—Rh | 80.0 (Pt) | 20.0 (Rh) |

The experiments were carried out in a glass cell as shown in FIG. 1 containing 0.12 g/L Pittsburgh No. 8 coal suspended in 1 M sulfuric acid with the above mentioned different working electrodes of known surface areas. The coal used was previously stored in an Argon filled Glove box to keep it from exposing to the oxygen which would otherwise form a film on the surface of the coal particles and could possibly lead to the increase in the overpotential for the electro-oxidation of the coal. The particle size of the coal used was ranging from 74-105 µm. The coal slurry was made by mixing the above coal dust with a specified concentration 1 M of sulfuric acid. The sulfuric acid not only increases the conductivity of the solution but also leaches out any iron in the coal. Counter electrode was made of Pt—Ru with thrice as much as the area of the working electrodes. The surface area of the counter electrode (cathode) was kept much larger than that of the working electrode (anode) in order to keep the anodic reaction limiting. A digitally controlled impeller was used to mix the slurries in order to maintain their homogeneity. All the experiments were carried out at 40° C. Once the cell was set, an ARBIN potentiostat was used to perform the experiments under potentiostatic conditions at different voltages (0.4, 0.6, 0.8 and 1V) in order to examine the reaction rate. The tests were run for at least 100 minutes with each electrode. Initially a baseline experiment with only 1 M $H_2SO_4$, which acts as a background was carried out to compare the results with coal slurry. The coal was characterized before and after any measurement was performed to determine: 1. Particle size, using sieving, and 2. Surface analysis, using Scanning Electron Microscopy (SEM) and X-Ray Diffraction (XRD). Iron content in the slurry solution was measured by Atomic Absorption Spectroscopy (AAS). Gases generated during the experiments were analyzed using an SRI Gas Chromatograph.

Figure 2:
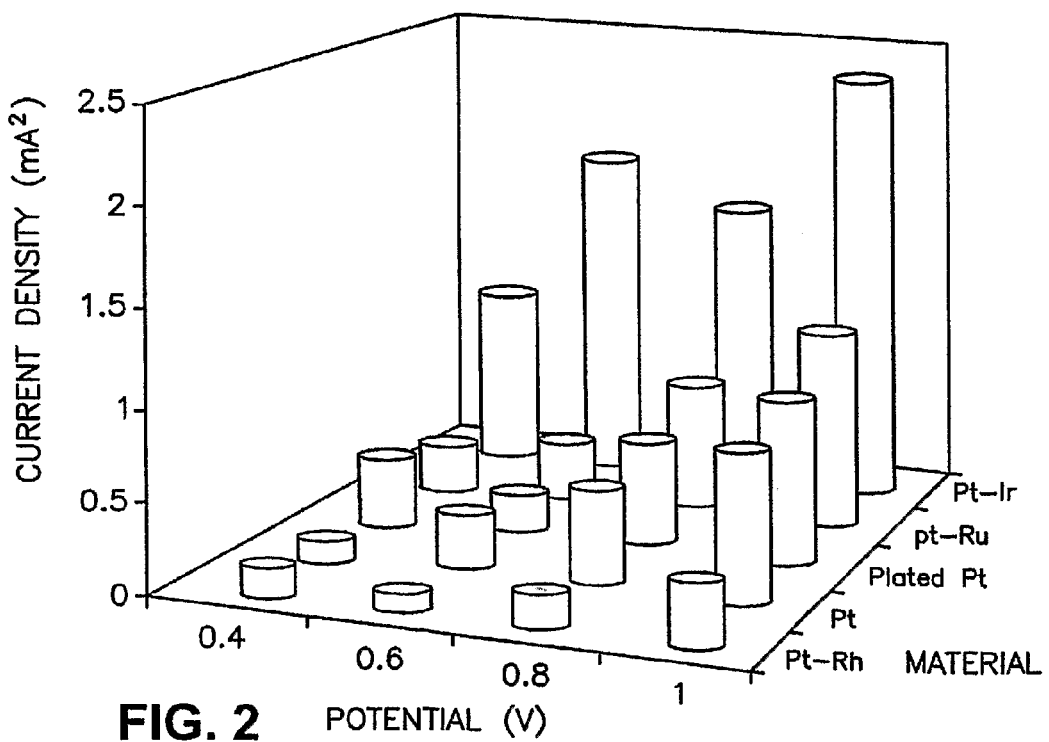
FIG. 2 shows the current densities under potentiostatic conditions for different electrodes (anode) at 40 C, for Pittsburgh No. 8 slurry with concentration 0.12 g/ml in 1M H2SO4.
Figure 4:
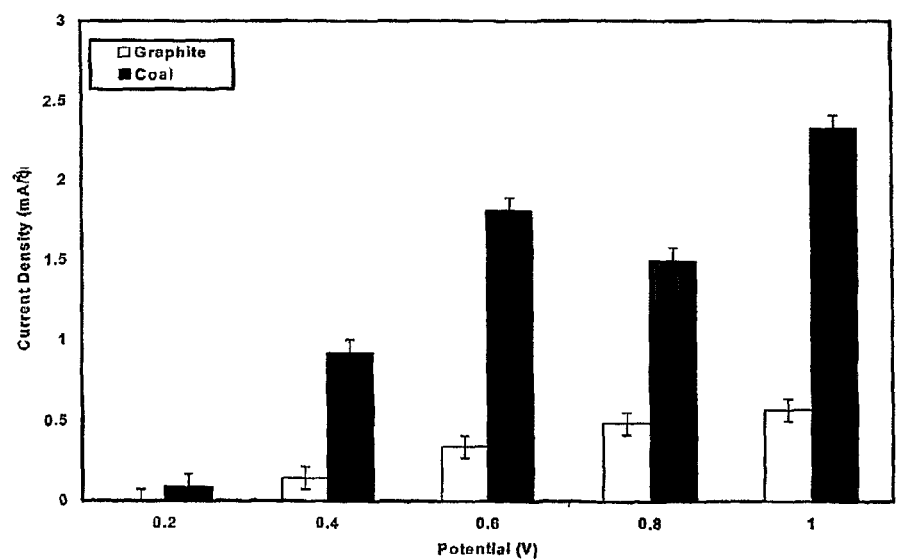
FIG. 4 shows current densities under potentiostatic conditions for Pittsburgh No. 8 and graphite slurries with concentration 0.12 g/ml in 1M H2SO4 at 406° C. Pt—Ir (80:20) was used as anode. The currents developed in the coal are higher than the ones observed in graphite.

The results shown in FIG. 2 indicate that the current densities generated by all the electrodes were small enough. Three trials were performed to determine the reproducibility of the experiments. The Pt—Ir electrode has the highest current densities while Pt—Rh has the lowest current densities. The current densities for coal at different potentials were much higher compared to the background currents for $H_2SO_4$ (the baseline for $H_2SO_4$ is not shown in FIG. 4 since its value is too low compared to current densities for coal), which indicates that the consumption of coal is indeed enhancing the reaction rate. It can also be seen that with increasing cell potential the current densities increased except for Pt—Ir at 0.8 V there is slight decrease, which could be possibly due to an experimental error. In the literatures it has been discussed that Pt—Ir is one of the best electrodes for the electrolysis of water in acidic medium. This is because there is a stable film formation on the surface of the Pt—Ir electrode whose electrical conductivity is very high compared to the film formed on the surface of the pure Pt. This could be the possible reason for the better performance of Pt—Ir. But the optimum amount of Ir content in Pt—Ir depends on the process you are dealing with. From FIG. 2 it can also be seen that there is no difference in the current densities between Pt and Platinized Pt electrode. There was no exfoliation of the platinized electrode material due to the coal particles. This means that to achieve the same current densities at lower cost it is better to use Platinized Pt electrode.

Figure 3A:
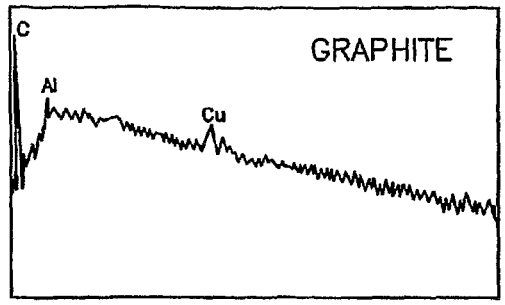
FIG. 3 shows the XRD spectrum for purified graphite and Pittsburgh Seam No. 8 identifying the main components. Coal contains iron, oxygen, and sulfur.
Figure 3B:
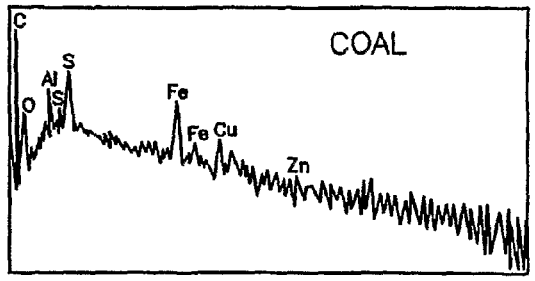

To elucidate the mechanisms involved in the electro-oxidation of coal, the performance of Pittsburgh Seam No. 8 coal was compared with the electrochemical performance of purified graphite. The graphite was provided by SGL Corporation. FIG. 3 shows the XRD spectrum for graphite and Pittsburgh Seam No. 8 coal identifying the main components. It is noted, the coal contains iron, sulfur, and oxygen, while the graphite does not. The SGL graphite was tested using the same electrodes described earlier at the same experimental conditions used for coal (particle size, electrolyte concentration, graphite concentration, temperature, and cell voltage).

Only the plot for the Pt—Ir at different cell potentials has been emphasized since it was observed that Pt—Ir has the better performance compared to other electrodes as mentioned earlier (see FIG. 2). From FIG. 5 it can be seen that the currents developed in the coal are higher than the ones observed in graphite. From this it is clear that not only carbon but also other metallic components, impurities in the coal, or active groups present in the coal are catalyzing the electro-oxidation reactions.

Figure 5:
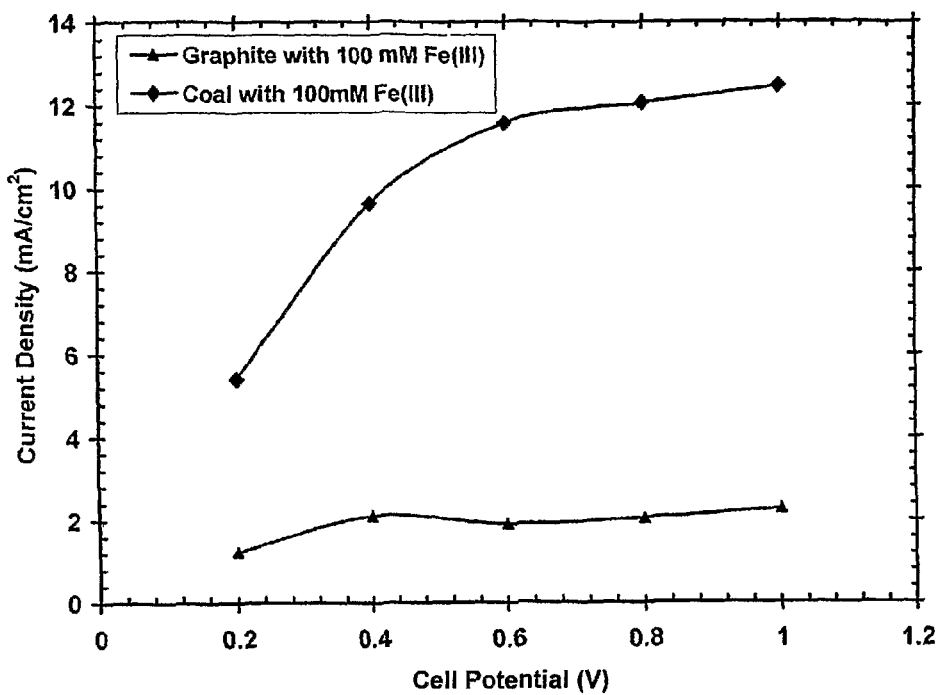
FIG. 5 shows the effect of Iron (III) on the electrolysis of graphite and coal on a Pt—Ir (80:20) electrode at 40° C., 1M H2SO4, concentration of coal or graphite was kept constant at 0.12 g/ml.

To evaluate the effect of iron on the electro-oxidation of coal, the electrochemical performance of graphite at different concentrations of iron (III) was evaluated (the results shown in FIG. 5 are only Pt—Ir with 100 mM $Fe^{+3}$). As shown in FIG. 5 an increase in the current density was observed with increasing the concentration of $Fe^{+3}$ in solution for both coal and graphite. However, the observed currents for graphite were not as high as that for coal, which indicated that: 1. the iron content in coal is responsible for the higher current densities, and 2. the structure and morphology of the coal may also have an influence in the electrochemical performance. This issue is currently under investigation and it will be presented in future publications.

Figure 6:
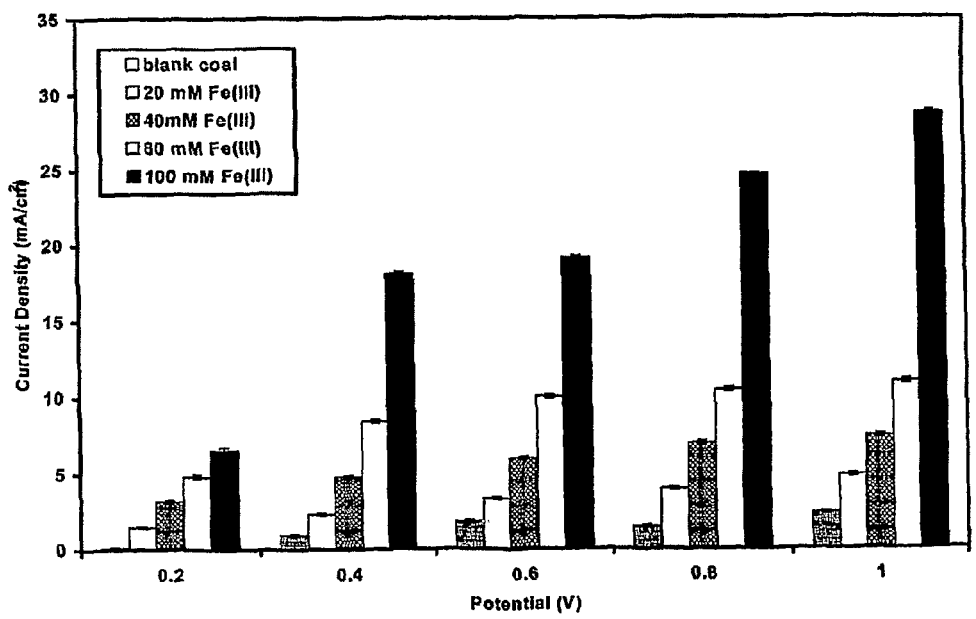
FIG. 6 shows current densities under potentiostatic conditions for Pittsburgh No. 8 slurries with concentration 0.12 g/ml in 1M $H_2SO_4$ at 40° C. at different $Fe^{+3}$ concentrations. Pt—Ir (80:20) was used as anode. The $Fe^{+3}$ concentration in solution has a positive effect on the current densities developed in the cell.

Enhancement of Reaction Rate Due to the Presence of Additives ($Fe^{+2}/Fe^{+3}$) in the Fuel Slurry in Acidic Medium (Example Shown for Bituminous Coal Slurries):

FIG. 6 shows the effect of $Fe^{+3}$ added in solution on the electrochemical performance of coal slurries at different operating voltages. Pt—Ir (80:20) was used as anode. The presence of additional iron has a positive impact on the current density. The results shown in FIG. 6 indicate that the conditions of the cell can be optimized (Fe concentration, cell temperature, electrode composition, coal concentration, electrolyte concentration, and particle size) to operate the cell at no more than 0.4 V at high current densities (at least 100 $mA/cm^2$).

Figure 7:
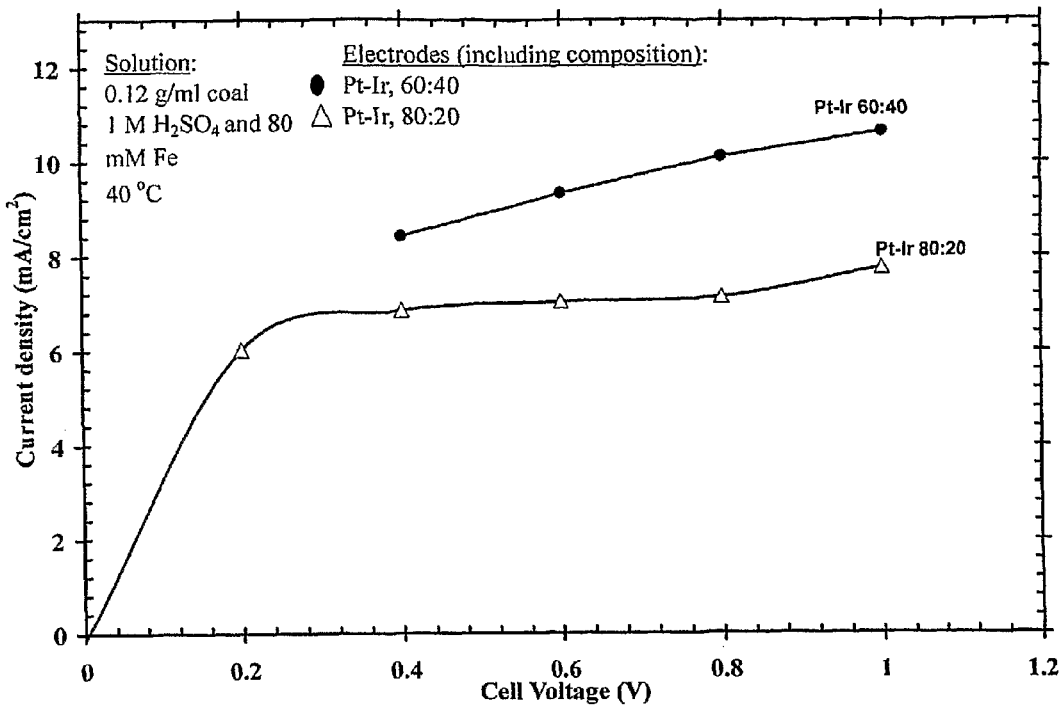
FIG. 7 shows current densities under potentiostatic conditions for Pt—Ir electrodes (anode) at 40° C., with Pittsburgh No 8 concentration 0.12 g/ml, 1 M H2SO4 and 80 mM Fe+3 concentration.

The effect of iridium (Ir) on the electrode recipe was evaluated. FIG. 7 shows the performance of two different electrode compositions: Pt—Ir 80:20 and Pt—Ir 60:40. The experiments were performed using the experimental set up shown in FIG. 1. All the experiments were carried out under potentiostatic conditions (at 0.4, 0.6, 0.8 and 1V) at 40° C., with a Pittsburgh No 8 coal concentration of 0.12 g/ml, 1 M $H_2SO_4$ and 80 mM iron concentration. The most important observation was that, the currents generated in our experiments were relatively high compared to the literature values. The maximum current density reported to date in the literature is by Coughlin and Farooque[1] and it is approximately 7.69 $mA/cm^2$ for 1V at 78° C., 0.36 g/ml coal (North Dakota Lignite) concentration with a particle size of 44 μm and 4.13 M $H_2SO_4$. In comparison, we observed higher current densities approximately 8.5 $mA/cm^2$ for 0.4 V for the Pt—Ir 60:40 electrode at much lower temperature 40° C., lower coal concentration (0.12 g/ml), bigger particle size (74-100 μm) and lower $H_2SO_4$ concentration (1 M), except we added 80 mM iron (III). This shows that iron (III) is enhancing the electro-oxidation of coal to a very large extent.

Figure 8:
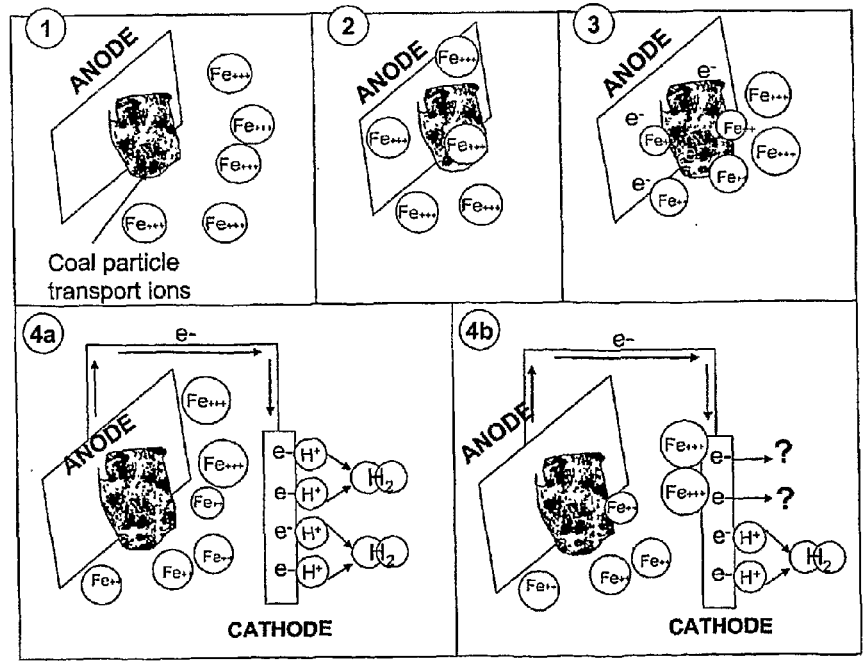
FIG. 8 shows a proposed Mechanism for the Oxidation of Coal in the Presence of Fe+2/Fe+3.

Based on the results observed and the literature review on the subject the following mechanism is proposed for the electro-oxidation of coal in the presence of $Fe^{+3}$. The mechanism is shown in FIG. 8. $Fe^{+3}$ oxidizes the coal according to the reaction proposed by Coughlin and Farooquee,[5] Eq. (4). That is, $Fe^{+3}$ is reduced at the surface of the coal to $Fe^{+2}$ according to a chemical reaction (see stages 1, 2, and 3 in FIG. 8). On the other hand, $Fe^{+2}$ gets oxidized back to $Fe^{+3}$ at the surface of the anode of the electrolytic cell according to Eq. (5), (see stage 4.a of FIG. 8). Coal needs to contact the anode of the electrolytic cell to transport the $Fe^{+2}$ to the surface of the anode (if there is no contact between the coal and the anode the process does not precede in time). Furthermore, when coal moves away from the anode it carries some of the $Fe^{+3}$ from the surface of the electrode which enhances the oxidation of $Fe^{+2}$ at the anode due to concentration effects. Mixing is very critical in the process as coal is responsible for transporting iron ions to the anode and away from the anode. The problem with the presence of excess $Fe^{+3}$ in solution is that it can also get reduced at the cathode of the electrolytic cell (as shown in stage 4.b of FIG. 8) decreasing the efficiency in the production of hydrogen. However, this effect could be overcome by optimizing the concentration of coal in such a way that there is plenty of coal available to reduce the $Fe^{+3}$, or in other words, plenty of coal to get oxidized.

Figure 9:
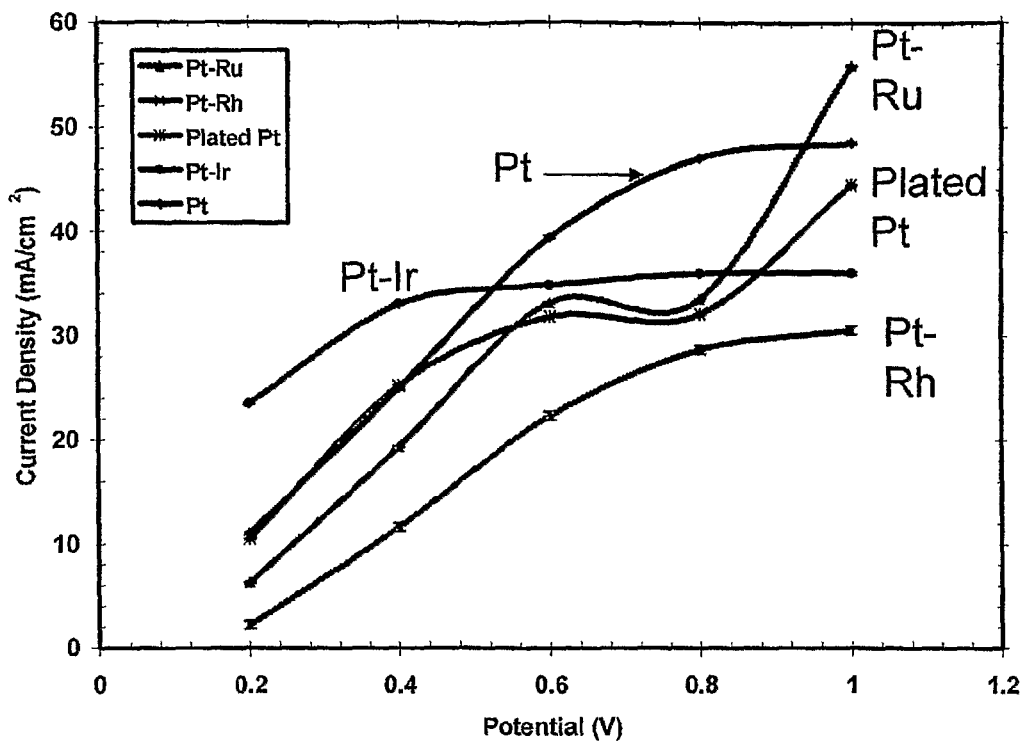
FIG. 9 shows current densities under potentiostatic conditions for different electrode materials at 40° C., with Pittsburgh No 8 concentration 0.12 g/ml, 1 M H2SO4 and 100 mM Fe+3/100 mM Fe+2 concentrations.

According to the mechanism proposed above, the electro-oxidation of coal should be enhanced by the synergistic effect of Fe (III) and Fe (II) present in solution. If the hypothesis is correct the current densities observed should be improved by the presence of $Fe^{+2}$ in solution simultaneously with $Fe^{+3}$. The effect of $Fe^{+2}/Fe^{+3}$ in solution is shown in FIG. 9. As demonstrated, the presence of $Fe^{+2}$ increases the current density of the cell. Again Pt—Ir seems to be the best electrode for the reaction (highest current at the lowest voltage). It can also be seen that the Pt—Ir electrode approaches concentration limitations faster than the other electrode materials.

Development of Electrocatalysts for the Electro-Oxidation of Solid Fuels in Acidic Medium (Example Shown for Bituminous Coal Slurries):

The results from Section I indicated that Pt—Ir is a suitable catalysts for the electro-oxidation of coal. This section describes the development of a large surface area electrode. The electrodes were fabricated by plating Pt—Ir—Rh on carbon fibers.

Titanium gauze obtained from Alfa Aesar was cut into a rectangular shape of known area. The cut foils were hooked to a titanium wire (diameter 0.5 mm) of suitable length on to the center of one of the edges of the rectangular foil. The reason for choosing titanium is due to its stability and low cost. The carbon fibers (approximate diameter of 5 mm) were wound uniformly on the surface of the gauze and the two ends of the fibers were tied to the titanium wire with a small piece of titanium foil to ensure proper electrical contact.

The Ti gauze was cleaned thoroughly to remove any dust particles with acetone, then with distilled water and finally with "ultra high purity water" (Aldrich chemicals). In the mean time the solution for plating was prepared using hexachloroplatinic salt and rhodium salt (Aldrich chemicals) for Pt—Rh and for Pt—Rh—Ir electrode even iridium salt is added along with the above two salts. These salts were dissolved in a known volume of strong acid (HCL) and ultra high purity water in suitable proportions. The solution was heated (close to 60° C.-70° C.) and mixed using ultrasonic water bath. The Pt—Rh was pulse deposited under galvanostatic conditions for at least 1-2 hours and the iridium salt was deposited for 5-6 hours. Rhodium was basically plated first to improve the conductivity of the electrode material so that other materials can be plated on the fibers easily. Intermittently after each pulsing the electrode was weighed to ensure if there was proper plating. The loadings of the nobel metals were kept between 2-4 mg/cm of fiber bundle (6000 fibers per bundle).

Development of Continuous Planar Solid Fuel Electrolytic Cell in Acidic Medium (Example Shown for Bituminous Coal Slurries):

The electrodes developed and described in section III were used to build a continuous planar coal electrolytic cell. The convenient shape and as well as the flow distribution channels present in the electrodes allowed the construction of the bench-scale coal electrolytic cell. The cell consists of acrylic blocks and Teflon gaskets. The electrodes are separated using a Nafion membrane or polyethylene. The testing system, which consists of coal electrolytic cell, pumps, heaters, and flow meters.

Figure 10:
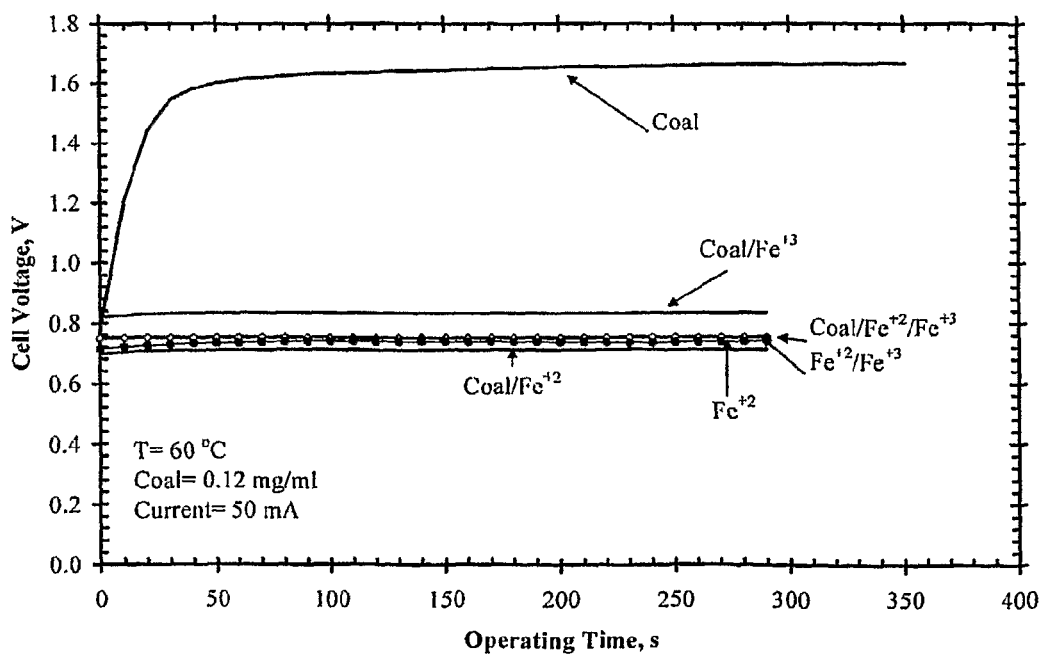
FIG. 10 shows galvanostatic experiments performed at 60° C. in a compact continuous bench scale coal electrolytic cell using Pt—Rh plated on carbon fibers as anode and Pt plated on carbon fibers as the cathode. The applied current was 50 mA.

Experiments were performed using the cell described above at 60° C. using Pt—Rh plated on carbon fibers as anode and Pt plated on carbon fibers as the cathode. The other experimental conditions were kept constant (concentration of coal slurry: 0.12 g/ml, concentration of $H_2SO_4$: 1 M, Concentration of $Fe^{+2}$, $Fe^{+3}$: 100 mM). A constant current was applied by stepping from 10-50-100 mA and tests were performed until the potential reached 1.8 V. FIG. 10 shows the galvanostatic performance of the coal electrolytic cell at 60° C. operating with coal slurries (1M $H_2SO_4$ and 0.12 g/ml of coal) at 50 mA (12.5 mA/cm$^2$). The effect of adding $Fe^{+3}$ on the cell is also shown. The results indicate that the cells gets completely polarized in short times. However, when $Fe^{+3}$ is added the operating time of the cell is longer which indicates that $Fe^{+3}$ enhances the oxidation of coal (as demonstrated in section III).

Figure 11:
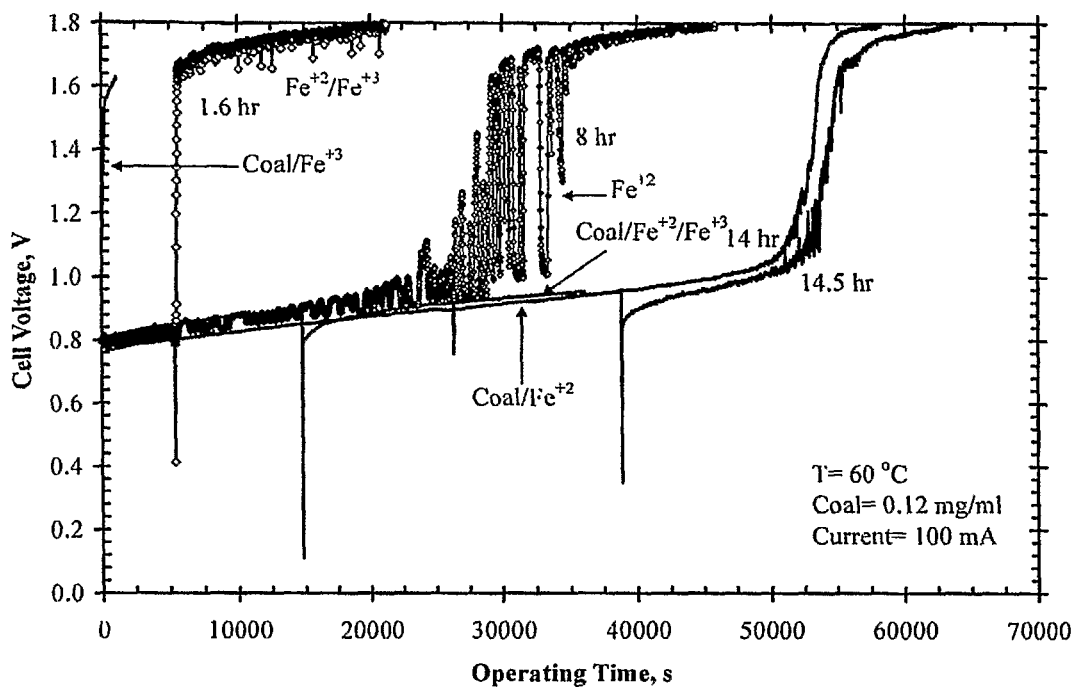
FIG. 11 shows galvanostatic performance of the coal electrolytic cell at 60° C. and 100 mA (25 mA/cm2) with different solutions. The results indicate that the electrolysis of coal is enhanced in the presence of Fe+2/Fe+3.

FIG. 11 shows the performance of the coal electrolytic cell at 60° C. operating at 100 mA (25 mA/cm$^2$) with different solutions: coal with $Fe^{+3}$, sulfuric acid with $Fe^{+3}/Fe^{+2}$, sulfuric acid with $Fe^{+2}$, and coal with $Fe+^2/Fe^{+3}$. The fact that the cell can operate for longer times in the presence of $Fe^{+2}/Fe^{+3}$ indicates that $Fe^{+3}$ enhances the oxidation of coal and at the same time the coal helps in reducing $Fe^{+3}$ to $Fe^{+2}$ which in turn allows a close loop. After a certain operating time, coal gets oxidized with a sudden increase in the cell voltage. The formation of films on the surface of the coal was observed. At the end of the experiments the coal particles agglomerated.

Electrochemical Performance Measurement in Continuous Coal Electrolytic Cell:

All the experiments were performed at 60° C. using Pt—Rh and Pt—Rh—Ir plated on carbon fibers as anodes and Pt plated on carbon fibers as cathode. Polarization experiments were carried out using the system described above containing 0.12 g/ml Pittsburgh No. 8 coal suspended in 1 M sulfuric acid with the above mentioned different working electrodes of known geometric areas. The coal used was previously stored in an Argon filled Glove box to keep it from exposing to the oxygen which would otherwise form a film on the surface of the coal particles and could possibly lead to the increase in the overpotential for the electro-oxidation of the coal. The particle size of the coal used was ranging from 74-105 μm. The coal slurry was made by mixing the above coal dust with a specified concentration of 1 M sulfuric acid which acts as electrolyte. Moreover in all the galvanostatic experiments the above parameters (concentration of coal slurry: 0.12 g/ml, concentration of $H_2SO_4$: 1 M, temperature 60° C., Concentration of $Fe^{2+}$, $Fe^{3+}$: 100 mM each) were kept constant to make a comparative study of only the effect of anodic materials on the electro-oxidation of Ohio coal. A constant current of 100 mA was applied and tests were performed until the potential reached 1.2 V.

Figure 12:
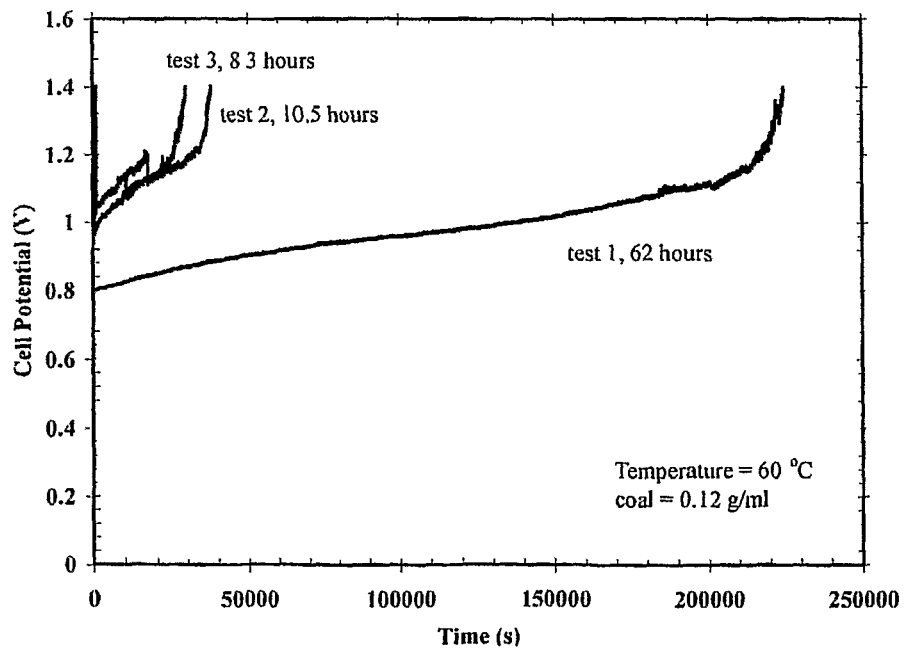
FIG. 12 shows Cell Voltage with Pt—Rh/carbon fiber anode electrode for 3 runs at 100 mA, 1M $H_2SO_4$, and coal concentration 0.12 g/ml operating at 60° C.

FIG. 12 shows the polarization performance of Pt—Rh anode for coal water slurry solution (0.12 g/ml) containing each of 100 mM $Fe^{+2}$ and $Fe^{+3}$ at 100 mA supplied constantly. The curves indicate that as time passed the cell potential increased gradually reaching the maximum set potential (1.2 V) for the cell. The first run (test 1) lasted for 62 hours. This showed that at this potential the coal almost got deactivated. The deactivation is caused because coal was recycled in the system. This does not mean that the coal lost all its calorific value. But the coal was just deactivated possibly due to the films formed on the surface of the coal. This is in agreement with what other researchers reported previously.[3,7] Other researchers described that these films are formed due to surface functional groups such as carboxyl, carbonyl and hydroxyl oxygen which act as intermediates accumulating on the surface of coal.[3,7]

Figure 13:
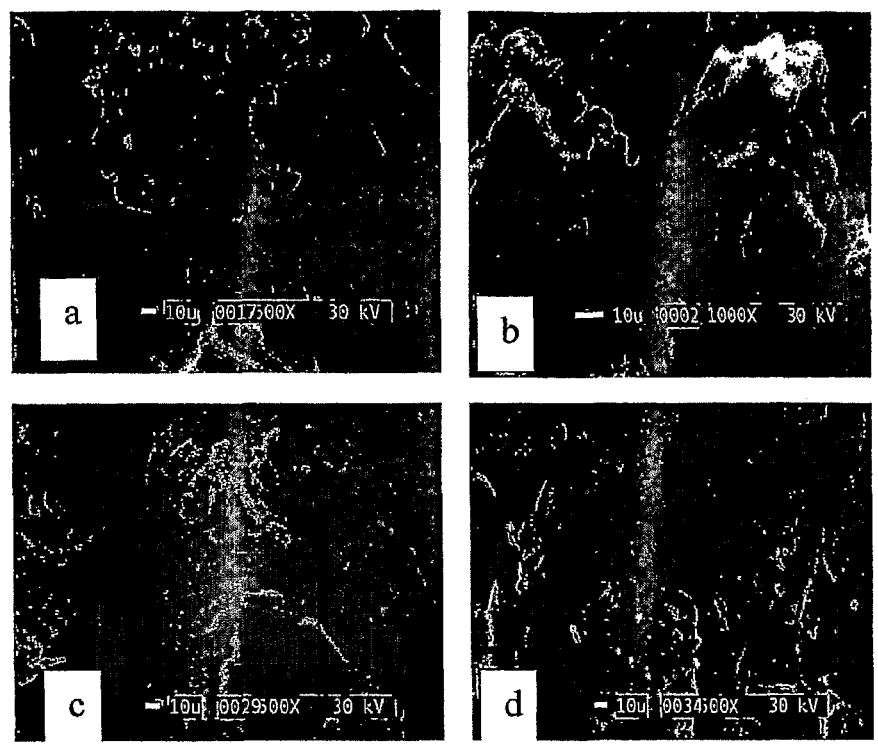
FIG. 13 shows SEM pictures of (a) unreacted coal before test 1 (Original coal), (b) reacted coal after test 1, (c) acetone washed coal and (d) acetone washed coal heat to 250° C. for 6-8 hours.

In order to estimate if the coal was really deactivated the coal was further treated as follows. The coal slurry was filtered (at this point about 2 g of the wet coal was collected for XRD and SEM analysis), and the volume of the filtrate was recorded to know approximately the amount of water evaporated. The SEM analysis for reacted and unreacted coal particles is shown in FIG. 13. The picture clearly distinguishes a very thin film formation on the surface of coal (FIG. 13b). Another observation on the reacted (polarized) coal showed that the coal particles are broken into smaller pieces and further agglomerating to form a bigger rough surfaced structure (FIG. 13b), when compared to unreacted sample which has lots of smooth surfaced single particle structure (FIG. 13a). After washing with acetone (as shown in FIG. 13c) it seemed that the agglomerated particles on the surface were washed away but still leaving behind a very uneven surface. But once the coal was heated to 250° C. for 6-8 hours the coal regained its smooth surface structure (FIG. 13d). The coal samples collected before and after the first run were also analyzed by using ultimate analysis technique (by Gas Technology Institute). The analysis or the compositions were based on the atomic carbon (C), hydrogen (H), oxygen (O), and nitrogen (N) is shown in table 2. The actual process efficiency based on hydrogen consumed as shown in the assay of the table 2 is 10.06% whereas the theoretical efficiency is 77%, which is higher indicating that the process efficiency has lot of room for improvement. But the main concern is identifying the critical parameters which can be manipulated so as to improve the efficiency of hydrogen generation. The total power consumption and energy consumption are reported in table 2 based on the hydrogen production.

TABLE 2

Ultimate analysis and energy consumption of coal tested with Pt—Rh electrode

| Entry | Result |
|---|---|
| Efficiency Hydrogen Production | 92-96% |
| Energy consumption (w-h/g $H_2$) Theoretical: 5.6 w-h/g $H_2$ | Test 1: 26.4 Test 2: 30.2 Test 3: 30.8 |
| Process efficiency for $H_2$ production (%) Theoretical: 77% | 10.06 |
| C, H, N, and S change (test 1) | C: 7.13% consumed H: 4.11% consumed N: 13.01% increased |

The coal slurry filtrate collected after the first run (test 1) was completely yellow indicating that the solution had iron (III). This also implies that the iron (III) got oxidized to iron (III). After the filtration the coal residue was washed with distilled water. Again the filtrate had iron (III) at lower concentrations due to its pale yellow color. This showed that the iron (III) was adhering to the surface of the coal where it is possibly helping coal to oxidize by accepting an electron from coal according to our previous hypothesis. Later the water washed coal was dried (at 100° C.) and cooled to room temperature for 3-5 hours to make sure that most of the water content is removed before it is extracted with acetone. The dried coal was then washed with acetone. The acetone-filtrate was light brown in color, indicating some amount of tar like compounds were extracted from coal, at the same time acetone aided in removing the surface films. Finally the acetone washed coal was dried in an oven at 250° C. for 6 hours. The dried coal was cooled to room temperature and about 2 g of the sample was collected for the analysis. Reactivated coal was mixed back with the initially collected coal filtrate containing iron. The coal slurry was re-polarized to check the activity regained after washing with acetone. It was observed that the electro-oxidation of coal lasted for 10.5 hours during the second run (test 2 as shown in FIG. 12). Similarly two other runs were performed (by filtering water and acetone washed) until the coal almost lost its activity. During the tests 3 and 4 the polarization lasted for 8 hours and 2 hours respectively (see FIG. 12).

Figure 14:
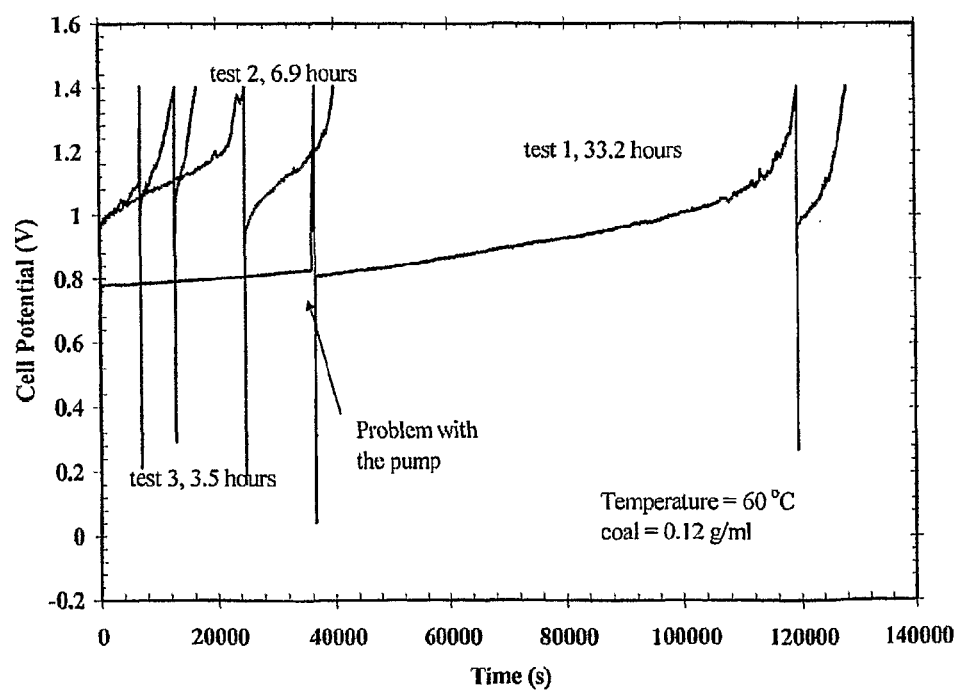
FIG. 14 shows Cell Voltage with Pt—Ir—Rh/carbon fiber anode electrode for 3 runs at 100 mA, 1M H2SO4, and coal concentration 0.12 g/ml operating at 60° C.

Similar experiments were also performed using Pt—Ir—Rh as anode. The results are depicted in FIG. 14. Similar to Pt—Rh three runs were performed and they lasted for 33.2, 6.9 and 3.5 hours respectively. When compared with the results for Pt—Rh the electrochemical performance is better with the Pt—Ir—Rh electrode as the cell voltage is lower. The times for polarization are different to the Pt—Rh electrode since the total volume of the solution was 1000 ml in case of Pt—Rh—Ir where as for Pt—Rh it was 1200 ml, hence the operating time is more in this case. Therefore, in both cases the experiments lasted for almost the same time, except that the Pt—Rh—Ir had a lower potential for the applied constant current of 100 mA. This showed that the better performance of the electrode was mainly due to the presence of Ir content. SEM and XRD analysis showed a very similar behavior like the one shown in FIG. 13.

Figure 15:
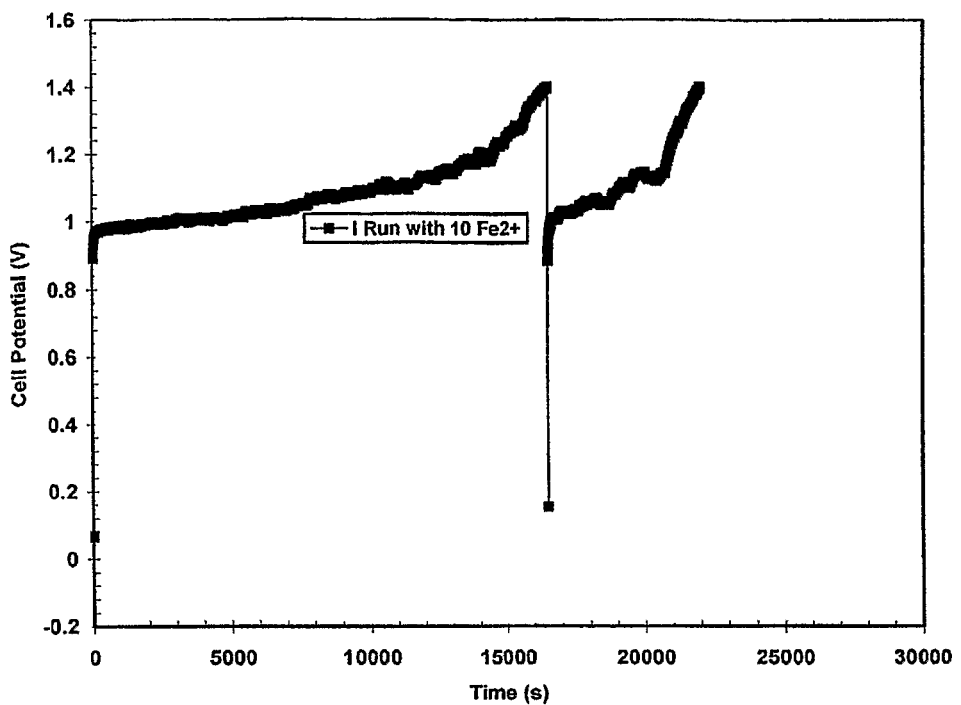
FIG. 15 shows Cell Voltage with Pt—Rh—Ir/carbon fiber electrode at 100 mA, 1M H2SO4, and coal concentration 0.12 g/ml operating at 60° C. with 10 mM Fe2+ and 100 mM Fe3+.

The hydrogen production efficiency for the Pt—Ir—Rh electrode was 11.63% with an energy consumption of 22.5 W/g $H_2$ (shown in table 3). One other experiment containing only 10 mM $Fe^{2+}$ and 100 mM $Fe^{3+}$ was also performed. The test lasted for only 6 hours (as shown in FIG. 15) therefore further runs were not performed with this concentration. This very much proved the previous hypothesis for these electrodes that $Fe^{2+}$ is important for the electro-oxidation of coal.

TABLE 3

Ultimate analysis of coal tested with Pt—Ir—Rh electrode

| Entry | Result |
|---|---|
| Efficiency Hydrogen Production (%) | 92-96% |
| Energy consumption (w-h/g $H_2$) Theoretical: 5.6 w-h/g $H_2$ | Test 1: 22.5 Test 2: 30.1 Test 3: 30.0 |
| Process efficiency for $H_2$ production (%) Theoretical: 77% | 11.63 |
| C, H, N, and S change (test 1) | C: 7.40% consumed H: 12.72% consumed N: 16.26% increased |

After so many runs of activation and deactivation using both anodes it was observed that coal lost its electrochemical activity, but it seemed that the coal still had some calorific value or heating value which was not possible to be extracted completely or close to completion by electrochemical gasification. This very much implies that the coal has some chemicals which are electrochemically active (quinones[9,10]) species and as time passes they are consumed leaving behind the part which is electrochemically inactive.

Gas Collection Experiments:

The gas collection experiments were performed using Pt—Ir—Rh/carbon fiber electrode. The experimental conditions were slightly different and they are explained as follows: Temperature—80° C., coal slurry concentration—0.04 g/ml, $H_2SO_4$ concentration—1.5 M, concentration of $Fe^{+2}$ and Fe+3—100 mM each, current 300 mA. The experimental conditions were intensified to enhance the oxidation of coal. The experiments were performed in two setups: a) batch system and b) continuous circulation system. The batch system was mainly used to evaluate the rate of generation of $CO_2$ due to chemical oxidation and also the effect of temperature on the evolution rate of $CO_2$. These two tests were studied both in the absence and presence of iron content. All the results were reported based on the compositions recorded by SRI Gas chromatography.

Figure 16:
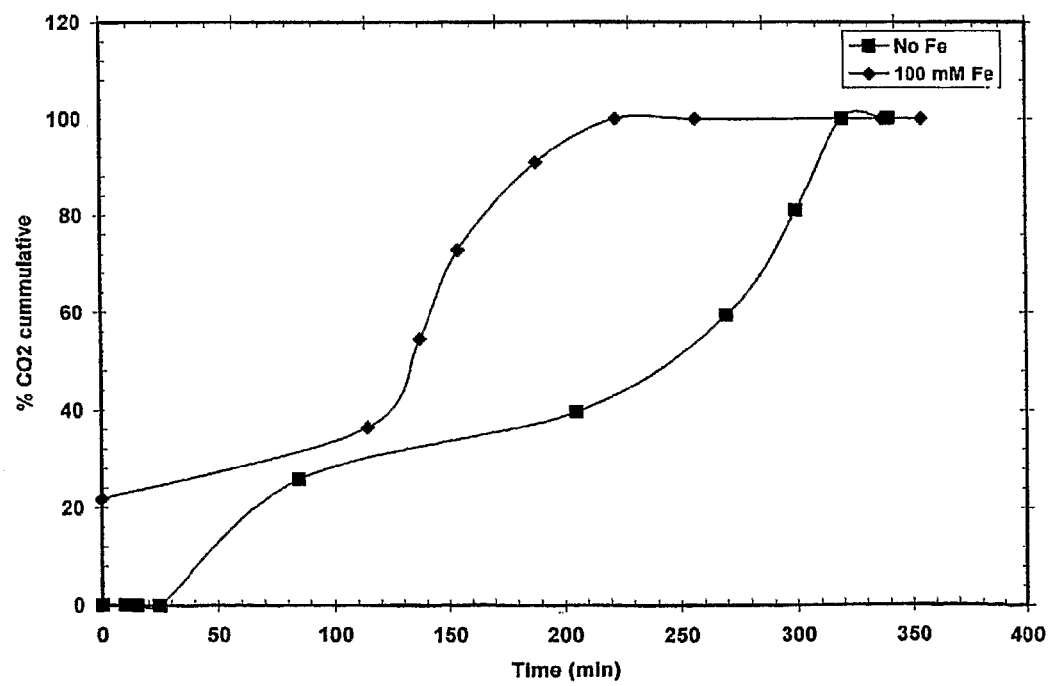
FIG. 16 shows a batch test, effect of time on $CO_2$ evolution.

FIG. 16 shows the effect of time, it can be seen that initially the percent cumulative $CO_2$ evolution was 20% for coal slurry containing iron while for the coal slurry in the absence of iron content it was negligible. As time passed there was gradual increase in $CO_2$ evolution for the first 100 minutes in both cases and then there was a rapid increase for the next 100 minutes with a very steep slope in case of coal containing iron while in case of bare coal also the $CO_2$ evolution increased but with a lesser slope. After 200 minutes the $CO_2$ evolution stabilized in both the cases. These results indicate that the presence of Fe salts is very important for the complete oxidation of coal.

Figure 17:
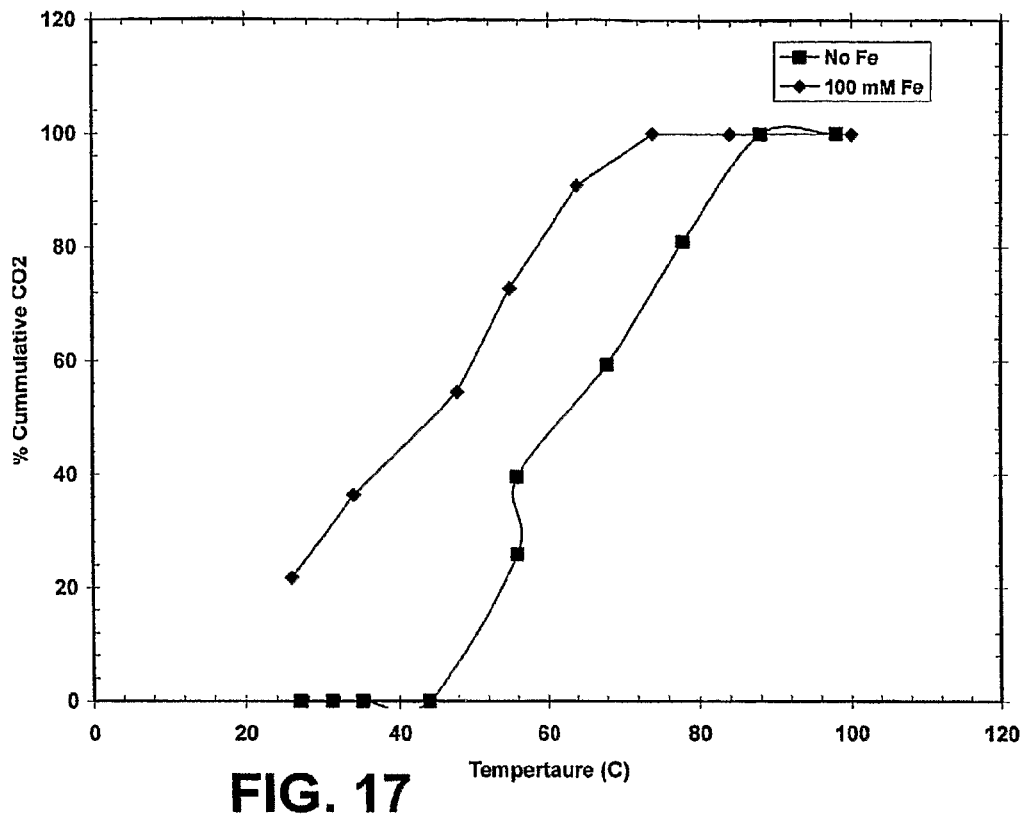
FIG. 17 shows a batch test, effect of temperature on $CO_2$ evolution.

The effect of temperature in presence and absence of iron content in the coal slurry is shown in FIG. 17. The behavior was pretty much same (slope) except that the coal containing iron imitated the coal without iron with a difference of 20° C., i.e. less by 20° C. and also for coal slurry without iron initially there was no $CO_2$ evolution until 40° C.

Similar experiments were performed with a continuous circulation of coal slurry in the same setup described above. The major breakthrough was that the testing system allowed the quantification of the gases produced during the electrolysis. The flow meters were replaced by gas collectors. It observed that the flow meters were not able to sense the flow of gases generated as the pressure of the gases produced was not enough. The gases produced (at the anode and cathode) were characterized using a Gas Chromatograph. The efficiency of the energy used by the system was 98% and 39.5% for the production of $H_2$ and $CO_2$, respectively. These results are encouraging and demonstrate that the electro-oxidation of a bituminous coal is possible (the highest efficiency reported in the literature 1-10 for the production of $CO_2$ is 30% for a lighter coal, North Dakota Lignite, at more intense conditions: 120° C., and 4M $H_2SO_4$).

The continuous system was also used to electrolyze water in the cell in order to compare the energy consumed during water electrolysis with the energy consumed during coal electrolysis. The energy consumption for the electrolysis of coal at 60° C. was 22.5 W-h/g $H_2$, while for water electrolysis at the same operating conditions in our cell was 42 W-h/g $H_2$ (46.5% lower energy consumption for the electrolysis of coal). These results indicate that the chemical energy of the coal is being used to minimize the energy consumption. This proves that coal is being oxidized in the medium.

The systems described herein have significantly increased the electro-oxidation of coal in acidic medium. Basically, the current densities had increased from 8 $mA/cm^2$ reported in the literature[1] to 75 $mA/cm^2$ (this is an increased of 940% with respect to the state-of-the-art practice). The gases produced (at the anode and cathode) were characterized using a Gas Chromatograph. The efficiency of the energy used by the system was 98% and 39.5% for the production of $H_2$ and $CO_2$, respectively. These results are encouraging and demonstrate that the electro-oxidation of a bituminous coal is possible (the highest efficiency reported in the literature[1-10] for the production of $CO_2$ is 30% for a lighter coal, North Dakota Lignite, at more intense conditions: 120° C., and 4M $H_2SO_4$).

The continuous system was also used to electrolyze water in the cell in order to compare the energy consumed during water electrolysis with the energy consumed during coal electrolysis. The energy consumption for the electrolysis of coal at 60° C. was 22.5 W-h/g $H_2$, while for water electrolysis at the same operating conditions in our cell was 42 W-h/g $H_2$ (46.5% lower energy consumption for the electrolysis of coal). These results indicate that the chemical energy of the coal is being used to minimize the energy consumption. This proves that coal is being oxidized in the medium.

The results reported in this section are based on using the systems described herein: 1. The electro-oxidation of Pittsburgh No. 8 coal is enhanced on Pt—Ir electrodes, 2. A catalytic effect of $Fe^{+3}/Fe^{+2}$ added in solution on the electrochemical oxidation of coal slurries. 3. The use of novel electrodes (by electro-deposition of noble metals: Pt, and Ir) supported on carbon fibers (which provide large surface area) for the electrooxidation of Pittsburgh No. 8 coal. The loading of noble metals is low (less than 4 mg/cm of fiber bundle, 6000 fibers per bundle). Reliable data demonstrate that the electrodes last for long periods of time (testing of the electrodes have been performed for more than 200 hrs of operation) without deterioration. 4. A planar bench-scale coal electrolytic cell was built using the novel electrodes. The cell has operated galvanostatically at 300 mA (75 $mA/cm^2$) at 80° C. with a cell voltage of 0.7-0.9 V without significant detrimental performance when the Pt/Ir electrodes are used for up to 36 hours (starts as low as 0.7). The slight increase in the cell voltage with time is because the coal is getting oxidized seems it is recycled to the cell (that is fresh coal is not continuously pumped).

Figure 19:
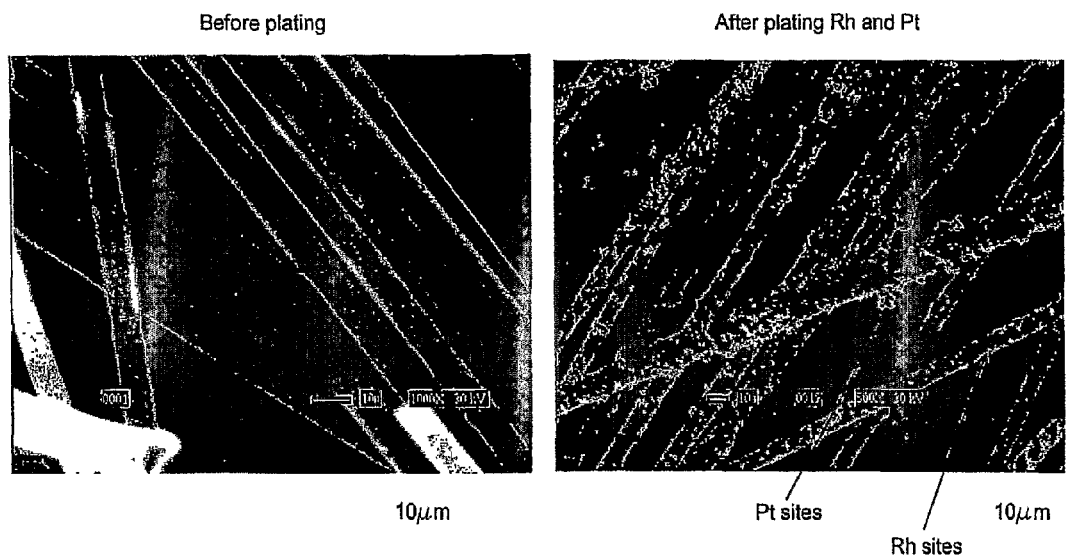
FIG. 19 shows SEM photographs of the carbon fibers before plating and after plating.

Electrode Preparation:

FIG. 19 shows a schematic representation of the procedure used to increase the electronic conductivity of the carbon fibers during plating (and also during the operation of the electrode). The fibers were wrapped on a titanium gauze, therefore, there were in electric contact with the metal at different points. This improvement allowed an easy and homogenous plating of the fibers at any point. The electronic conductivity at any point in the fiber was the same as the electronic conductivity of the Ti gauze (which is really high).

FIG. 19 shows a Scanning Electron Microscope photograph of the electrode before plating and after plating. A first layer of Rh was deposited on the electrode to increase the electronic conductivity of the fibers. A second layer consisted of Pt was plated on the electrode. The Pt layer did not cover all the Rh sites, leaving Rh surface to act as a preferred H adsorbent.

I Electrodes

Figure 18:
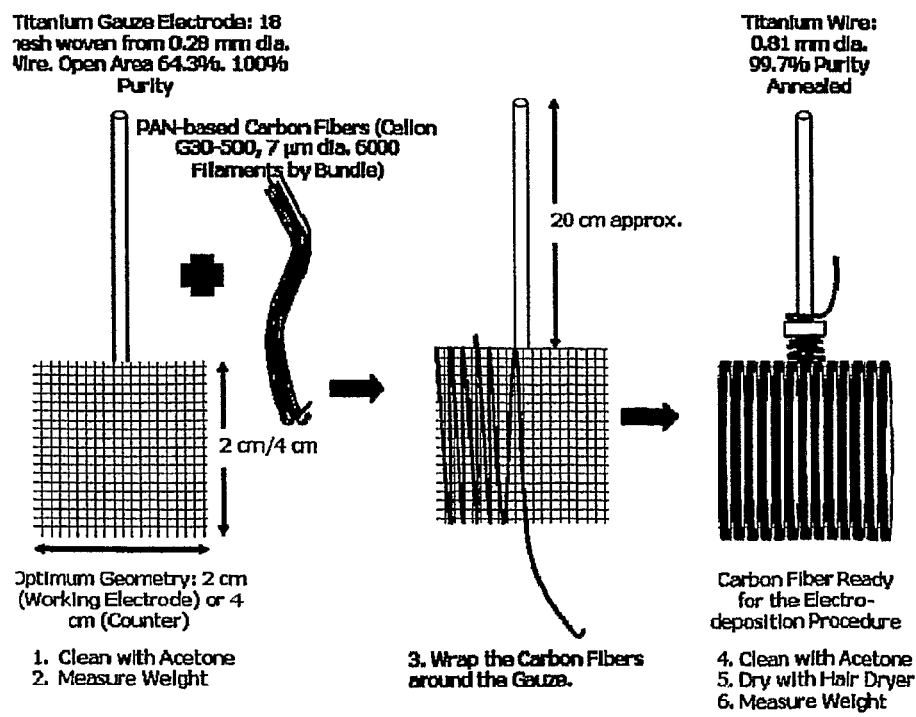
FIG. 18 shows a process for preparing carbon fiber for electrodeposition procedure.

The schematic for the construction of the electrode is shown if FIG. 18. The plating procedure consists into two steps: 1. First layer plating and 2. Second layer plating First layer plating. This step consists on plating the carbon fibers or the carbon nanotubes with materials that show a strong affinity for OH or H. Examples include: Rh, Ru, and Pd. Rh is the prefer material. The first layer coverage is preferably about 2 mg/cm or greater of fiber to guarantee a complete plating of the fiber.

Second layer plating: This step consists on plating the electrode with materials that have a strong affinity for the oxidation of coal, petroleum coke, and char. Examples include: Pt and Ir. Monometallic deposition and/or bimetallic deposition of these materials can be performed. Ratios of Pt:Ir can range from 100% Pt-0% Ir to 80% Pt-20% Ir.

Table 4 summarizes the plating conditions for the anode and the cathode of the electrolytic cell. After plating the Rhodium, the electrode is weighted. The weight corresponds to the Rhodium loading. Then, the Platinum is deposited on top of the Rhodium. After the procedure is completed, the electrode is measure again. The measurement will correspond to the total loading. The Platinum loading is obtained subtracting the total loading from the Rhodium previous measurement. The relation Platinum/Rhodium is then calculated so as the percentage of fixed loading. Because the loading depends on the length of the fiber, another measurement have to be calculated. It is known that 10 cm of fiber bundle (6000 fibers per bundle) weights 39.1 mg, and because it is know the weight of fiber (calculated in step 1), then by proportionality it can be known the length of the total fiber that is being used in each electrode.

Table 5 summarizes the general conditions of the plating bath. During the whole plating procedure, the solution was mixed to enhance the transport of the species to the fibers and or nanotubes. Table 6 shows examples of some electrodes compositions, lengths, and loadings of noble metals.

Summarizing, the electrodes consist of a carbon fiber and/or carbon nanotubes substrates which were plated with a first layer of noble metal. This metal had a strong affinity for OH and H. Then after, the electrode was plated (single deposition and/or bimetallic deposition) with a noble metal that has a strong affinity for coal/petroleum coke/char oxidation.

TABLE 4

Conditions for Electroplating Technique in the Deposition of Different Metals on the Carbon Fibers and/or Carbon Nanotubes

| Metal Plated | Rhodium (Rh) | Platinum (Pt) | Nickel (Ni) |
|---|---|---|---|
| Position on the Electrode Surface: | First | Second | First |
| Geometry: | $2 \times 2$ cm$^2$ | $2 \times 2$ cm$^2$ | $4 \times 4$ cm$^2$ |
| Conditions of the Solution: | Total Volume: 250 ml | Total Volume: 250 ml | Total Volume: 500 ml |
| Composition of the Solution: | 1M HCl + Rhodium (III) Chloride (RhCl$_3$•XH$_2$O). Rh 38.5-45.5% (different compositions, depending on loadings) | 1M HCl + Hydrogen Hexachloroplatinate (IV) Hydrate, 99.9% (H$_2$PtCl$_6$•6H$_2$O) (different compositions, depending on loadings) | Watt's Bath: Nickel Sulphate (NiSO$_4$•6H$_2$O) 280 g/L Nickel Chloride (NiCl$_2$•6H$_2$O) 40 g/L Boric Acid (H$_3$BO$_3$) 30 g/L |
| Counter Electrode: | Double Platinum Foil Purity 99.95% 20 × 50 × (0.004") | Double Platinum Foil Purity 99.95% 20 × 50 × (0.004") | Nickel Spheres (6 to 16 mm p.a.) in contact with a Nickel Foil Electrode 99.9+% Purity (0.125 mm thick) |
| Temperature: | 70° C. | 70° C. | 45° C. |
| Time: | See Applied Current | See Applied Current | 8 h approximately |
| Loading: | 5 mg/cm of Fiber | 5 mg/cm of Fiber | Fixed Parameter. Between 6-8 mg/length of fiber |
| Applied Current: | 100 mA (30 min) + 120 mA (30-60 min). It depends on loading | 40 mA (10 min) + 60 (10 min) + 80 mA (10 min) + 100 mA (1-2 h). It depends on loading | Stairs from 100 mA, to 120 mA and then to 140 mA |

TABLE 5

General Conditions of the Plating Bath

| | |
|---|---|
| Pre-treatment | Degreasing using acetone |
| Bath type | Chloride salts in HCl |
| Solution composition | Metal/metal ratios varied for optimum deposit composition |
| Applied current | Galvanostatic (40 to 200 mA) |
| Deposition time | Varied from 30 min to several hours |

TABLE 6

Examples of some Electrode Compositions and Loadings. The length of fiber is for each bundle (6000 fibers in a bundle)

| ID | Composition | Ratio Pt:Rh | Total Loading, mg | Length, cm | mg/cm |
|---|---|---|---|---|---|
| 2x2-1 | 21%Rh—79%Pt | 3.81 | 252.5 | 30.0 | 8.4 |
| 2x2-2 | 30%Rh—70%Pt | 2.31 | 146.0 | 33.4 | 4.4 |
| 2x2-3 | 23%Rh—73%Pt | 3.44 | 151.5 | 30.5 | 5.0 |
| 2x2-4 | 30%Rh—70%Pt | 2.32 | 308.8 | 31.3 | 9.9 |
| 2x2-5 | Rh—Ir—Pt | 1.36 | 196.4 | 38.0 | 5.2 |
| 2x2-6 | 80%Rh—20%Pt | 0.25 | 169.9 | 33.3 | 5.1 |
| 2x2-7 | 100%Rh | — | 157.0 | 31.6 | 5.0 |
| 2x2-8 | 30%Rh—70%Pt | 2.30 | 160.6 | 30.9 | 5.2 |
| 2x2-9 | 100%Pt | — | 161.9 | 32.3 | 5.0 |

Electrolytic Cell

The anode of the electrolytic cell was constructed using the procedure described in section I. It consists of carbon fibers plated with two layers of materials. The first layer is made of a metal that has affinity for OH and H, while the second layer is made of a metal or metals that have affinity for coal, petroleum coke, and char. The cathode was made similar to the anode.

The fibers are rested (be wrapped) on a metal gauze. Any inert material for the acidic deposition bath as well as the acidic medium of the solution could be used. The best choice seems to be titanium.

The case of the cell can be made of any nonconductive polymer. Examples include: polypropylene, acrylic, stainless steel, titanium, etc. The choice for the material depends on temperature and pressure.

The gaskets of the cell were made of Teflon. The choice for the gasket depend on the temperature, concentration of sulfuric acid, and pressure of the cell.

The electrodes in the cell (anode and cathode) need to be separated by a membrane or separator that stands the strong acidic conditions of the medium. Examples include: polyethylene and Nafio. The best choice seems to be polyethylene.

Additives $Fe^{+2}$ and $Fe^{+3}$ has a catalytic effect on the electro-oxidation of coal. Other salts can also be used, for example $Ce^{+4}$. The best choice seems to be iron salts seems they are already present in the coal and they are less expensive than $Ce^{+4}$. The range for the concentration of $Fe^{+2}$ and $F^{+3}$ goes from 10 mM to 1M.

Operating Conditions of the Cell

Figure 20:
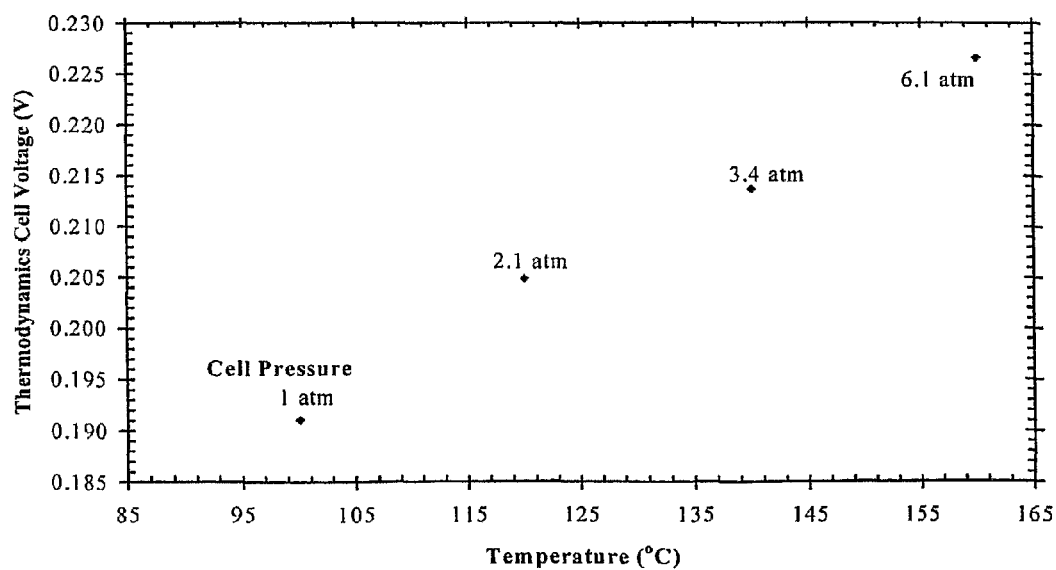
FIG. 20 shows the effect of pressure and temperature on the thermodynamics potential of the Coal electrolytic cell.

The following settings are examples for the operating conditions of the coal electrolytic cell: Temperature. The temperature can vary from 25° C. to 160° C. Higher temperatures require an increased in pressure to keep the water in liquid phase. The higher the temperature the faster the rate of electro-oxidation of coal. FIG. 20 shows the thermodynamics effect of increasing temperature and pressure on the cell voltage. The results indicate that pressure does not significantly increase the voltage of the cell according to the thermodynamics as long as the temperature is increased.

Particle Size.

The particle size can be allowed to vary from between 210-250 µm to less than 44 µm. The smaller the particles size the faster the electro-oxidation rate.

Slurry Concentration and Fuel Type.

The slurry concentration can be varied between 0.04 to 0.4 kg/dm$^3$. The system described herein may use solid fuels such as: petroleum coke, all ranges of coal, and chars. Low bituminous coal oxidize faster.

Iron Concentration ($Fe^{+3}/Fe^{+2}$).

The iron content can be changed from the original value presented in the coal slurry to up to 1 M.

Electrolyte and Electrolyte Concentration.

The electrolyte used in the cell can be any acid; examples include phosphoric acid, acetic acid, trifluoromethanesulfonic acid, and sulfuric acid. The preferred choice is sulfuric acid. The electrolyte concentration can vary from 0.1 to 5 M.

Practical Applications

Application to an Electrolytic Cell:

The anode and cathode materials described herein, and the additives described can be used for the production of hydrogen in-situ from the electrolysis of solid fuels such as petroleum coke, all ranges of coal, and chars. Because the anode and cathode are separated by a membrane, pure hydrogen is produced at the cathode compartment and pure $CO_2$ is produced at the anode compartment. Therefore, purification of hydrogen is not needed and it can be directly used in any type of fuel cell. Because of the purity of the hydrogen and the low operating temperature of the fuel cell, it is anticipated that the coal electrolytic cell can be easily coupled with a proton exchange membrane (PEM) fuel cell. The electrolytic cell can use electric energy from renewable (wind, solar energy) and traditional sources (coal or natural gas). The electrochemical gasification of coal produces hydrogen directly from coal without $NO_x$, $SO_x$ pollution, or subsequent downstream gas separation or purification. The immediate anticipated benefits of the technology are: 1. Production of hydrogen at lower cost than the current technology (natural gas reforming) for distributed power, 2. Fuel flexibility, 3. Enhancement of the national security in the United States through less reliance on foreign fuel, and 4. Zero hazardous environmental emissions. In addition, the storage of coal/water slurries is commercially feasible; therefore, the electrolysis of coal/water slurries helps solve the problem of hydrogen storage.

Low Temperature Solid Fuel Cell:

The developed anode with the presence of the additives can be used for the electro-oxidation of solid slurries (e.g., coal, petroleum coke, and chars) that couple with a cathode electrode in which the reduction of oxygen takes place constitute a direct low temperature solid slurries fuel cell.

Remediation Process:

The developed electrode materials as well as the electrolytic cell can be used to treat acid waters with high content of iron. At the anode of the cell the oxidation of the slurry takes place while at the cathode hydrogen is produced. If the hydrogen is used to power a fuel cell, clean water is returned into the process. Acidic waters with high content of iron are usually found in rivers and lakes near coal mining.

Previous tests performed by other researchers[1-3] reported that the choice of electrode material for the anode did not have a significant effect on the electro-oxidation of coal slurries. Different results had been reported herein.

The examples set forth herein are for illustrative purposes only and are not meant to limit the invention.

REFERENCES

1. R. W. Coughlin and M. Farooque, "Hydrogen Production from Coal, Water and Electrons," *Nature* 279, 301-303 (1979).
2. R. W. Coughlin and M. Farooque, "Anodic Coal Reaction Lowers Energy Consumption of Metal Electrowinning," *Nature* 280, 666-668 (1979).
3. R. W. Coughlin and M. Farooque, "Electrochemical Gasification of Coal (Investigation of Operating Conditions and Variables)," *Fuel* 58, 705-712 (1979).
4. R. P. Baldwin, K. F. Jones, J. T. Joseph, and J. L. Wong, "Voltammetry and Electrolysis of Coal Slurries and H-coal Liquids," *Fuel* 60, 739-743 (1981).
5. P. M. Dhooge, D. E. Stilwell, and S. Park, "Electrochemical Studies of Coal Slurry Oxidation Mechanisms," *J. Electrochem. Soc.* 129, 1719-1724 (1981).
6. R. W. Coughlin and M. Farooque, "Thermodynamic, Kinetic, and Mass Balance Aspects of Coal-Depolarized Water Electrolysis," *Ind. Eng. Chem. Process Des. Dev.* 21, 559-564 (1982).
7. G. Okada, V. Guruswamy, and J. O. Bockris, "On the Electrolysis of Coal Slurries," *J. Electrochem. Soc.* 128, 2097-2102 (1981).
8. S. Park, "Electrochemistry of Carbonaceous Materials and Coal," *J. Electrochem. Soc.* 131, 363C-373C (1984).
9. P. M. Dhooge and S. Park, "Electrochemistry of Coal Slurries. II. Studies on Various Experimental Parameters Affecting Oxidation of Coal Slurries," *J. Electrochem. Soc.* 130, 1029-1036 (1983).
10. P. M. Dhooge and S. Park, "Electrochemistry of Coal Slurries. Ill. FTIR Studies of Electrolysis of Coal," *J. Electrochem. Soc.* 130, 1539-1542 (1983).
11. V. A. Vaseen, "Method and Apparatus for Hydrogen production in an Absorber Liquid by Electrochemical of Coal and Water", U.S. Pat. No. 4,226,683, US, 1979.
12. A. F. Sammells and M. R. St. John, "Continuous Flow Electrochemical Cell and Process", U.S. Pat. No. 4,388,162, US, 1983.
13. C. T. Sweeney and J. K. Bird, "Desulfurization of Coal", U.S. Pat. No. 4,226,683, US, 1985.
14. K. M. Patton and F. E. Senftle, "Solution Mining of Coal by Electrolysis", U.S. Pat. No. 4,453,594, US, 1984.
15. T. E. Botts, V. A. Markham, J. R. Powell, and N. Y. Shoreham, "Process for Electrochemically Gasifying Coal Using Electromagnetism", U.S. Pat. No. 4,643,809, US, 1987.
16. M. H. Miles, E. A. Klaus, B. P. Gunn, J. R. Locker, W. E. Serafin, and S. Srinivasan, "The oxygen evolution reaction on platinum, iridium, ruthenium and their alloys at 80° C. in acid solutions," *Electrochimica Acta* 23, 521-526 (1978).

The invention claimed is:

1. An electrolytic cell for the production of hydrogen from coal slurries comprising:
   a) an anode;
   b) a cathode;
   c) an electrolyte, wherein the electrolyte in acidic; and
   d) a fuel comprising coal, petroleum, coke, and char
      wherein at least one of the anode, the cathode, or the anode and the cathode comprise an electrode comprising:
   e) a carbon electrode material;
   f) a first noble metal layer on the carbon electrode material; and
   g) a second noble metal layer on the first metal layer, wherein the carbon electrode material is selected from the group consisting of carbon fibers, carbon nanotubes, carbon microbeads, and carbon nanospheres;
      wherein said first noble metal is one of rhodium, ruthenium, and palladium and combinations thereof; and wherein said second layer is one of platinum, iridium, and combinations thereof.

2. The electrolytic cell claimed in claim 1 wherein said cathode has a surface area larger than said anode.

3. The electrolytic cell claimed in claim 1 wherein said first metal comprises Rh and said second metal comprises Pt.

4. The electrolytic cell claimed in claim 3 having a ratio of Rh:Pt of 20% Rh:80% Pt to 80% Rh:20% Pt.

5. The electrolytic cell of claim 3 further comprising a catalytic additive.

6. The electrolytic cell of claim 3 wherein the catalytic additive is selected from iron salts, cerium salts, and combinations thereof.

7. The electrolytic cell of claim 3 further comprising:
a) a case for the electrolytic cells;
b) a separator between the anode and cathode; and
c) a catalytic additive.

8. The electrolytic cell of claim 7 wherein the catalytic additive is present in a concentration from the value present in the fuel to about 1 M.

9. The electrolytic cell of claim 7 wherein the electrolytic cell operates in the temperature range from about 25° C. to about 160° C.

10. The electrolytic cell of claim 7 wherein the particle size of the fuel is in the range from about 40 μm to about 250 μm.

11. The electrolytic cell of claim 7 wherein the particle size of the fuel is in the range from about 210 μm to about 250 μm.

12. The electrolytic cell of claim 7 wherein the slurry concentration of the fuel is in the range from about 0.04 to about 0.4 kg/dm$^3$.

13. The electrolytic cell of claim 7 wherein the electrolyte is selected from the group consisting of phosphoric acid; acetic acid, trifluoromethanesulfonic acid, sulfuric acid, and combinations thereof.

14. An electrode comprising a carbon electrode material
a first noble metal layer on the carbon electrode; and
a second noble metal layer on the first noble metal layer, wherein the carbon electrode material is selected from the group consisting of carbon fibers, carbon nanotubes, carbon microbeads, carbon nanospheres, and combinations thereof;
wherein said first noble metal layer comprises rhodium and said second noble metal layer comprises platinum, and wherein said electrode has a ratio of Rh:Pt from 20%:80Pt to about 80% Rh:20% Pt.

* * * * *